(12) United States Patent
Kawamura et al.

(10) Patent No.: US 11,958,268 B2
(45) Date of Patent: Apr. 16, 2024

(54) METAL-CARBON FIBER REINFORCED PLASTIC MATERIAL COMPOSITE AND METHOD OF PRODUCING METAL-CARBON FIBER REINFORCED PLASTIC MATERIAL COMPOSITE

(71) Applicant: NIPPON STEEL CORPORATION, Tokyo (JP)

(72) Inventors: Yasuaki Kawamura, Tokyo (JP); Kohei Ueda, Tokyo (JP); Masumi Koori, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 676 days.

(21) Appl. No.: 16/972,286

(22) PCT Filed: Jun. 14, 2019

(86) PCT No.: PCT/JP2019/023767
§ 371 (c)(1),
(2) Date: Dec. 4, 2020

(87) PCT Pub. No.: WO2019/240283
PCT Pub. Date: Dec. 19, 2019

(65) Prior Publication Data
US 2021/0114350 A1    Apr. 22, 2021

(30) Foreign Application Priority Data
Jun. 14, 2018   (JP) .................................. 2018-113340

(51) Int. Cl.
*B32B 15/14*   (2006.01)
*B32B 5/02*    (2006.01)
(Continued)

(52) U.S. Cl.
CPC .............. *B32B 15/14* (2013.01); *B32B 5/022* (2013.01); *B32B 15/18* (2013.01); *C08K 7/06* (2013.01);
(Continued)

(58) Field of Classification Search
CPC .. B32B 5/02; B32B 7/12; B32B 15/14; B32B 15/18; B32B 15/20; B32B 2250/02;
(Continued)

(56) References Cited

U.S. PATENT DOCUMENTS

| 2015/0375478 A1 | 12/2015 | Gruhn et al. |
| 2018/0079879 A1 | 3/2018 | Otsuki et al. |

FOREIGN PATENT DOCUMENTS

| CN | 107428970 a | 12/2017 |
| JP | 8-27417 A | 1/1996 |

(Continued)

*Primary Examiner* — Camie S Thompson
(74) *Attorney, Agent, or Firm* — Birch, Stewart, Kolasch & Birch, LLP

(57) ABSTRACT

To provide a metal-carbon fiber reinforced plastic material (CFRP) composite that has excellent adhesion and adhesion durability at a member interface and a method of producing a metal-CFRP composite.

The metal-CFRP composite according to the present invention includes: a metal member; a CFRP layer; and one or two layers of coating layers provided between the metal member and the CFRP layer. In the case where the coating layer consists of one layer, the coating layer is a coating layer containing an isocyanate group, and the matrix resin contains a phenoxy resin as a main component thereof, contains an epoxy group, and has bonds represented in (a structural formula 1) in the vicinity of an interface between the CFRP layer and the coating layer. In the case where the coating layer consists of two layers, the first coating layer that is located on the metal member side is a coating layer containing an isocyanate group, and the second coating layer
(Continued)

that is located on the CFRP layer side is a coating layer that contains an epoxy resin as a main component thereof, and has bonds represented in (a structural formula 1) in the vicinity of an interface between the first coating layer and the second coating layer.

18 Claims, 4 Drawing Sheets

(51) Int. Cl.
   *B32B 15/18*      (2006.01)
   *C08K 7/06*       (2006.01)
   *C09D 167/00*     (2006.01)
   *C09D 175/04*     (2006.01)
(52) U.S. Cl.
   CPC ......... *C09D 167/00* (2013.01); *C09D 175/04* (2013.01); *B32B 2255/06* (2013.01); *B32B 2255/26* (2013.01); *B32B 2260/021* (2013.01); *B32B 2260/046* (2013.01); *B32B 2262/106* (2013.01)

(58) Field of Classification Search
   CPC ............ B32B 2255/02; B32B 2255/06; B32B 2255/26; B32B 2255/28; B32B 2260/021; B32B 2260/046; B32B 2262/106; B32B 2307/54; B32B 2605/00; B32B 2605/08; C08G 18/0866; C08G 18/42; C08G 18/706; C08K 7/06; C09D 167/00; C09D 175/04; C09D 175/06
   USPC ....................................................... 442/378
   See application file for complete search history.

(56)         References Cited

FOREIGN PATENT DOCUMENTS

JP        10-128905 A       5/1998
   JP        2014/157132 A1   10/2014
   JP        2015-145461 A     8/2015

METAL-CARBON FIBER REINFORCED PLASTIC MATERIAL COMPOSITE AND METHOD OF PRODUCING METAL-CARBON FIBER REINFORCED PLASTIC MATERIAL COMPOSITE

TECHNICAL FIELD

The present invention relates to a metal-carbon fiber reinforced plastic material composite and a method of producing a metal-carbon fiber reinforced plastic material composite.

BACKGROUND ART

Fiber reinforced plastics (FRP), which are composites of reinforced fibers (for example, glass fibers, carbon fibers, and so on) contained in a matrix resin, are lightweight and excellent in a tensile strength, processability, and the like. Therefore, they are widely used in a range from consumer fields to industrial applications. In the automotive industry as well, with a focus on the light weight, tensile strength, processability, and so on of the FRP, the application of FRP to automotive members is being considered in order to meet the need for lighter vehicles, which leads to improvements in fuel efficiency and other performance.

Among them, carbon fiber reinforced plastics (CFRP), which use carbon fibers as reinforcing fibers, are a promising material for various applications, including automotive members, because they are particularly lightweight and particularly excellent in a tensile strength due to the strength of carbon fibers.

In the meantime, a matrix resin of the CFRP is generally a thermosetting resin such as an epoxy resin and has brittleness, and thus may be subjected to brittle fracture when deformed. Further, the CFRP are expensive generally and are a factor in increasing the cost of various members such as automotive members.

In the meantime, in order to solve these problems while maintaining the above-mentioned advantages of the CFRP, recent studies have examined metal member-CFRP composite materials, in which a metal member and CFRP are laminated to be integrated (make a composite). The metal member has ductility, and thus, making a composite with such a metal member reduces brittleness and allows the composite material to be deformed and processed. Furthermore, making a composite with a low-cost metal member and the CFRP can reduce the use amount of CFRP, thus lowering the cost of automotive members.

Incidentally, a composite member made of a metal member and CFRP is a composite material composed of members with different properties, and thus, if the adhesion at the interface is not good, it is impossible to obtain the original performance of the composite material. When considering the application to automobile bodies, in particular, automobile bodies are being used in various environments. Among others, water and water vapor penetrate into the composite material, to thereby cause a defect of reduced adhesion in some cases. Several proposals have been made in order to prevent such a defect in the composite member.

For example, in Patent Document 1 and Patent Document 2 below, a coated metal plate with excellent initial adhesiveness and adhesive durability has been proposed. In these patent documents, a composite material has been proposed in which a plate-shaped fiber-reinforced plastic material is bonded to the surface of a plate-shaped metal material via a thermoplastic resin adhesive layer. Further, Patent Document 3 below has proposed a vehicle body panel structure that is bonded to a joint portion between an outer plate made of a different material other than a steel plate and an inner plate made of a steel plate or a different material other than a steel plate with a mastic adhesive.

PRIOR ART DOCUMENT

Patent Document

[Patent Document 1] Japanese Laid-open Patent Publication No. 8-27417
[Patent Document 2] Japanese Laid-open Patent Publication No. 10-128905
[Patent Document 3] Japanese Laid-open Patent Publication No. 2015-145461

DISCLOSURE OF THE INVENTION

Problems to be Solved by the Invention

The coated steel plate proposed in Patent Document 1 uses a methylol group-type methylated melamine resin and an imino group-type methylated melamine resin as a cross-linking agent in a coating composition made of a polyester resin, so that the surface of an obtained coating film is not completely methoxymethylated and methylol groups or imino groups remain, to thereby improve the adhesiveness of the coating film. However, the adhesion between the remaining methylol groups or imino groups and the adhesive is mainly based on hydrogen bonding, and therefore, no consideration is given to the adhesiveness that requires greater strength and strength durability.

Further, the coated metal plate proposed in Patent Document 2 has adhesiveness to a two-part acrylic-type adhesive by being formed with a polyester-based coating material using, as a curing agent, an isocyanate with urea-based resin beads blended in a top coating layer. Therefore, in Patent Document 2, no consideration is given to the adhesiveness to a resin containing an epoxy group.

Further, in Patent Document 3, a room temperature curable modified silicone adhesive is used as a mastic adhesive for bonding different materials, to thereby have adhesiveness after a heat resistance test and an effect of suppressing thermal strain due to heating. Therefore, in Patent Document 3, no consideration is given to the durability through water.

Besides, with respect to Patent Document 2 and Patent Document 3, as in Patent Document 1, the bonding between the adhesive and the adherend is based on secondary bonds at the interface between the adhesive and the adherend and no consideration is given to the adhesiveness that requires higher strength and strength durability.

Thus, the present invention has been made in consideration of the above-described problems, and an object of the present invention is to provide a metal-carbon fiber reinforced plastic material composite that has excellent adhesion and adhesion durability at a member interface in a composite having a metal member and CFRP and a method of producing a metal-carbon fiber reinforced plastic material composite.

Means for Solving the Problems

As a result of earnest investigations to solve the above-described problems, the present inventors found out that the adhesion at the interface in the composite and the improvement in the adhesion durability can be achieved by the formation of primary bonds between two layers forming the interface.

The present invention has been completed based on such findings as above, and the gist thereof is as follows.

[1] A metal-carbon fiber reinforced plastic material composite, includes: a metal member; a carbon fiber reinforced plastic material that contains a predetermined matrix resin and a carbon fiber material present in the matrix resin; and one or two layers of coating layers provided between the metal member and the carbon fiber reinforced plastic material, in which in the case where the coating layer consists of one layer, the coating layer is a coating layer that is arranged on at least a portion of the metal member, contains a predetermined resin as a main component thereof, and contains an isocyanate group, and the matrix resin is a matrix resin that contains a phenoxy resin as a main component thereof and contains an epoxy group, and has bonds represented in the following (structural formula 1) in the vicinity of an interface between the carbon fiber reinforced plastic material and the coating layer, and in the case where the coating layer consists of two layers, the first coating layer that is located on the metal member side is a coating layer that is arranged on at least a portion of the metal member, contains a predetermined resin as a main component thereof, and contains an isocyanate group, and the second coating layer that is located on the carbon fiber reinforced plastic material side is a coating layer that is arranged on at least a portion of the first coating layer and contains an epoxy resin as a main component thereof, and has bonds represented in the following (structural formula 1) in the vicinity of an interface between the first coating layer and the second coating layer.

[2] The metal-carbon fiber reinforced plastic material composite according to [1], in which the coating layer consists of one layer, and when a region from the interface between the carbon fiber reinforced plastic material and the coating layer to 20 μm in the thickness direction toward the carbon fiber reinforced plastic material side is defined as an interface vicinity, a region up to 10 μm from the middle of the carbon fiber reinforced plastic material in the thickness direction is defined as a middle vicinity, and the interface vicinity and the middle vicinity are each observed by Fourier transform infrared spectroscopy, peaks P1 to P3 exist in the following wavenumber bands and peak intensities I1 to I3 of the peaks P1 to P3 in each of the wavenumber bands satisfy the relationships expressed in the following expression (1) and expression (2).

P1: 3660 cm$^{-1}$ to 3570 cm$^{-1}$
P2: 1200 cm$^{-1}$ to 1050 cm$^{-1}$
P3: 1750 cm$^{-1}$ to 1715 cm$^{-1}$ $$(I2_{IF}/I1_{IF}) \geq 1.5 \times (I2_C/I1_C) \quad \text{expression (1)}$$

$$(I3_{IF}/I1_{IF}) \geq 1.5 \times (I3_C/I1_C) \quad \text{expression (2)}$$

Here, in the above expression (1) and expression (2), a subscript IF indicates the peak when the interface vicinity is observed, and a subscript C indicates the peak when the middle vicinity is observed.

[3] The metal-carbon fiber reinforced plastic material composite according to [1], in which the coating layer consists of two layers, and when a region from the interface between the coating layer and the second coating layer to 20 μm in the thickness direction toward the second coating layer side is defined as an interface vicinity, a region up to 10 μm from the middle of the second coating layer in the thickness direction is defined as a middle vicinity, and the interface vicinity and the middle vicinity are each observed by Fourier transform infrared spectroscopy, peaks P1 to P3 exist in the following wavenumber bands and peak intensities I1 to I3 of the peaks P1 to P3 in each of the wavenumber bands satisfy the relationships expressed in the following expression (1) and expression (2).

P1: 3660 cm$^{-1}$ to 3570 cm$^{-1}$
P2: 1200 cm$^{-1}$ to 1050 cm$^{-1}$
P3: 1750 cm$^{-1}$ to 1715 cm$^{-1}$ $$(I2_{IF}/I1_{IF}) \geq 1.5 \times (I2_C/I1_C) \quad \text{expression (1)}$$

$$(I3_{IF}/I1_{IF}) \geq 1.5 \times (I3_C/I1_C) \quad \text{expression (2)}$$

Here, in the above expression (1) and expression (2), a subscript IF indicates the peak when the interface vicinity is observed, and a subscript C indicates the peak when the middle vicinity is observed.

[4] The metal-carbon fiber reinforced plastic material composite according to [3], in which the matrix resin is at least one of a phenoxy resin and an epoxy resin.

[5] The metal-carbon fiber reinforced plastic material composite according to [1] 1 to [4], in which the coating layer contains a thermosetting resin as a main component thereof.

[6] The metal-carbon fiber reinforced plastic material composite according to [5], in which the thermosetting resin is at least one of a polyester resin and a urethane resin.

[7] A method of producing a metal-carbon fiber reinforced plastic material composite, the metal-carbon fiber reinforced plastic material composite including: a metal member; a carbon fiber reinforced plastic material that contains a predetermined matrix resin and a carbon fiber material present in the matrix resin; and one or two layers of coating layers provided between the metal member and the carbon fiber reinforced plastic material, the method includes: in the case where the coating layer consists of one layer, a step of applying a coating material, the coating material containing a predetermined resin as a main component thereof and containing a blocked isocyanate having an isocyanate group protected by a blocking agent, to at least a portion of the metal plate or the metal member and performing drying or baking thereon to form the coating layer with an unreacted isocyanate remaining therein; and a step of molding the metal plate or the metal member on which the coating layer with the unreacted isocyanate remaining therein is formed and bonding the carbon fiber reinforced plastic material, the carbon fiber reinforced plastic material containing, as the matrix resin, a matrix resin containing a phenoxy resin as a main component thereof and containing an epoxy group, to an upper layer of the coating layer by thermocompression bonding, the method includes: in the case where the coating layer consists of two layers, a step of applying a first coating material, the first coating material containing a predetermined resin as a main component thereof and containing a blocked isocyanate having an isocyanate group protected by a blocking agent, to at least a portion of the metal plate or the metal member and performing drying or baking thereon to form the first coating layer with an unreacted isocyanate remaining therein; a step of applying a second coating material containing an epoxy resin as a main component thereof to at least a portion of the first coating layer with the unreacted isocyanate remaining therein and performing drying or baking thereon to form the second coating layer; and a step of bonding the carbon fiber reinforced plastic material to at least a portion of the second coating layer by thermocompression bonding, in which a dissociation temperature of the blocked isocyanate is lower than a thermocompression bonding temperature in the step of bonding by the thermocompression bonding, when the dissociation temperature of the blocked isocyanate is set to $\alpha$ [° C.] and a maximum attained temperature in the case where the coating layer consists of one layer and in the step of forming the first coating layer in the case where the coating layer consists of two layers is set to $\beta$ [° C.], the maximum attained temperature $\beta$ is set to a temperature satisfying 80° C.$\leq\beta\leq$250° C. and $\alpha\leq\beta$ to make the unreacted blocked isocyanate remain in the formed coating layer and the formed first coating layer, a maximum attained temperature in the step of forming the second coating layer in the case where the coating layer consists of two layers is set to equal to or more than the dissociation temperature of the blocked isocyanate and less than the thermocompression bonding temperature, and as a thermocompression bonding condition in the step of bonding by the thermocompression bonding, the thermocompression bonding temperature falls within a range of 100° C. to 400° C., a pressure is 3 MPa or more, and a thermocompression bonding time is three minutes or more.

[8] The method of producing the metal-carbon fiber reinforced plastic material composite according to [7], in which in the vicinity of an interface between the carbon fiber reinforced plastic material and the coating layer in the case where the coating layer consists of one layer, or in the vicinity of an interface between the first coating layer and the second coating layer in the case where the coating layer consists of two layers, bonds represented in the following (structural formula 1) are formed.

[9] The method of producing the metal-carbon fiber reinforced plastic material composite according to [7] or [8], wherein in the coating material used in the step of forming the coating layer or the first coating layer, 1.2 to 2.0 equivalents of the blocked isocyanate are contained with respect to the amount of functional groups that react with the blocked isocyanate present in the resin contained in the coating material, and a time until the following step is performed after the step of forming the coating layer or the first coating layer is finished is set to 12 hours or less under an environment of a relative humidity of 40% or less.

[10] The method of producing the metal-carbon fiber reinforced plastic material composite according to [7] or [8], in which in the coating material used in the step of forming the coating layer or the first coating layer, as the blocked isocyanate, a first blocked isocyanate and a second blocked isocyanate that has a dissociation temperature higher than that of the first blocked isocyanate are contained, the content of the first blocked isocyanate is 1.0 to 1.2 equivalents with respect to the amount of functional groups that react with the first blocked isocyanate present in the resin contained in the coating material, the content of the second blocked isocyanate is 0.2 to 0.5 equivalents with respect to the amount of functional groups that react with the first blocked isocyanate present in the resin contained in the coating material, when in the step of forming the coating layer or the first coating layer, a dissociation temperature of the first blocked isocyanate is set to $\alpha1$, a dissociation temperature of the second blocked isocyanate is set to $\alpha2$, and the thermocompression bonding temperature in the step of bonding by the thermocompression bonding is set to $\gamma$, the maximum attained temperature $\beta$ is set so as to satisfy $\alpha1\leq\beta\leq\alpha2<\gamma$.

[11] The method of producing the metal-carbon fiber reinforced plastic material composite according to any one of [7] to [9], in which the maximum attained temperature $\beta$ [° C.] in the case where the coating layer consists of one layer and in the step of forming the first coating layer in the case where the coating layer consists of two layers is set to a temperature satisfying 80° C.$\leq\beta\leq$250° C. and $\alpha\leq\beta<(\alpha+30$° C.).

[12] The method of producing the metal-carbon fiber reinforced plastic material composite according to [10], in which the maximum attained temperature $\beta$ [° C.] in the case where the coating layer consists of one layer and in the step of forming the first coating layer in the case where the coating layer consists of two layers is set to a temperature satisfying 80° C.$\leq\beta\leq$250° C., $\alpha1\leq\beta$, and ($\beta+10$° C.)$<\alpha2<\gamma$.

[13] The method of producing the metal-carbon fiber reinforced plastic material composite according to any one of [7] to [12], in which the coating layer consists of one layer, and when a region from the interface between the carbon fiber reinforced plastic material and the coating layer to 20 μm in the thickness direction toward the carbon fiber reinforced plastic material side is defined as an interface vicinity, a region up to 10 μm from the middle of the carbon fiber reinforced plastic material in the thickness direction is defined as a middle vicinity, and the interface vicinity and the middle vicinity are each observed by Fourier transform infrared spectroscopy, peaks P1 to P3 exist in the following wavenumber bands and peak intensities I1 to I3 of the peaks P1 to P3 in each of the wavenumber bands satisfy the relationships expressed in the following expression (1) and expression (2).

P1: 3660 cm$^{-1}$ to 3570 cm$^{-1}$
P2: 1200 cm$^{-1}$ to 1050 cm$^{-1}$
P3: 1750 cm$^{-1}$ to 1715 cm$^{-1}$ $$(I2_{IF}/I1_{IF})\geq1.5\times(I2_C/I1_C) \qquad \text{expression (1)}$$

$$(I3_{IF}/I1_{IF})\geq1.5\times(I3_C/I1_C) \qquad \text{expression (2)}$$

Here, in the above expression (1) and expression (2), a subscript IF indicates the peak when the interface vicinity is observed, and a subscript C indicates the peak when the middle vicinity is observed.

[14] The method of producing the metal-carbon fiber reinforced plastic material composite according to any one of [7] to [12], in which the coating layer consists of two layers, and when a region from the interface between the coating layer and the second coating layer to 20 μm in the thickness direction toward the second coating layer side is defined as an interface vicinity, a region up to 10 μm from the middle of the second coating layer in the thickness direction is defined as a middle vicinity, and the interface vicinity and the middle vicinity are each observed by Fourier transform infrared spectroscopy, peaks P1 to P3 exist in the following wavenumber bands and peak intensities I1 to I3 of the peaks P1 to P3 in each of the wavenumber bands satisfy the relationships expressed in the following expression (1) and expression (2).
P1: 3660 cm$^{-1}$ to 3570 cm$^{-1}$
P2: 1200 cm$^{-1}$ to 1050 cm$^{-1}$
P3: 1750 cm$^{-1}$ to 1715 cm$^{-1}$ $$(I2_{IF}/I1_{IF}) \geq 1.5 \times (I2_C/I1_C) \quad \text{expression (1)}$$

$$(I3_{IF}/I1_{IF}) \geq 1.5 \times (I3_C/I1_C) \quad \text{expression (2)}$$

Here, in the above expression (1) and expression (2), a subscript IF indicates the peak when the interface vicinity is observed, and a subscript C indicates the peak when the middle vicinity is observed.

[15] The method of producing the metal-carbon fiber reinforced plastic material composite according to [14], in which the matrix resin is at least one of a phenoxy resin and an epoxy resin.

[16] The method of producing the metal-carbon fiber reinforced plastic material composite according to any one of [7] to [15], in which the coating layer contains a thermosetting resin as a main component thereof.

[17] The method of producing the metal-carbon fiber reinforced plastic material composite according to [16], in which the thermosetting resin is at least one of a polyester resin and a urethane resin.

[18] The method of producing the metal-carbon fiber reinforced plastic material composite according to any one of [7] to [17], in which before the step of bonding by the thermocompression bonding, at least one of a surface roughening treatment and a surface activation treatment is performed on a bonding surface of the carbon fiber reinforced plastic material.

[Chemical formula 1]

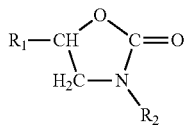

(Structural formula 1)

Here, in the above (structural formula 1), $R_1$ represents an epoxy side chain and $R_2$ represents an isocyanate side chain.

According to the present invention as explained above, primary bonds are formed at the interface between a carbon fiber reinforced plastic material and a coating layer, or the interface between a first coating layer and a second coating layer, thereby making it possible to provide a metal-carbon fiber reinforced plastic material composite that is excellent in adhesion and adhesion durability and a method of producing a metal-carbon fiber reinforced plastic material composite.

MODE FOR CARRYING OUT THE INVENTION

Figure 1:
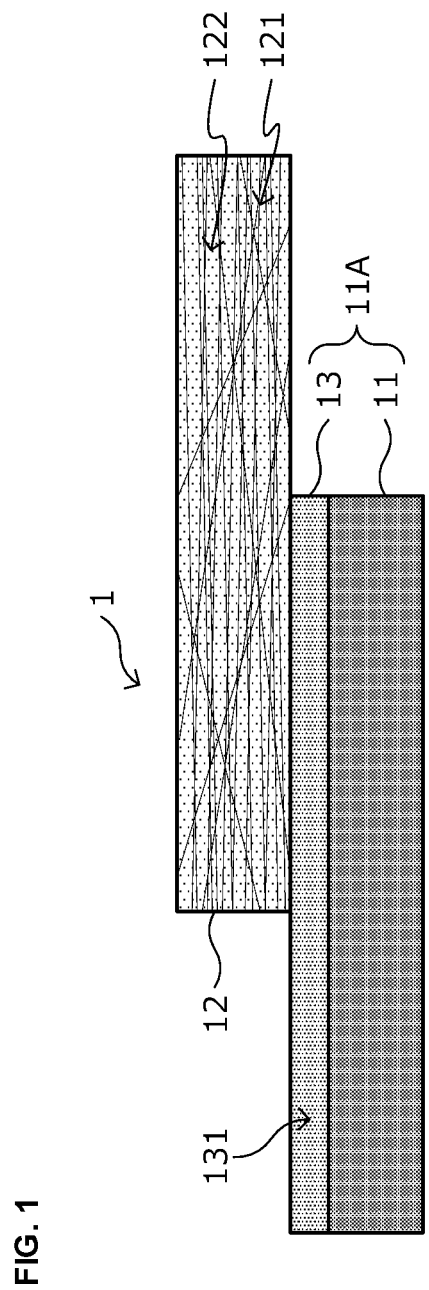
FIG. 1 is a schematic view of a cross section of a metal-carbon fiber reinforced plastic material composite according to a first embodiment of the present invention in a lamination direction.

Hereinafter, preferred embodiments of the present invention will be explained in detail with reference to the accompanying drawings. Incidentally, in this description and the drawing, the components having substantially the same functional configuration are denoted by the same reference numerals and symbols, thereby omitting the duplicate explanation.

Further, similar components in different embodiments are distinguished by attaching different alphabets after the same reference numerals and symbols. However, when there is no need to particularly distinguish each of a plurality of components having substantially the same functional configuration, only the same reference numerals and symbols are added. Further, for ease of explanation, each drawing is appropriately enlarged or reduced, and the drawing does not illustrate the actual size and ratio of each portion.

First Embodiment

<1. Metal-Carbon Fiber Reinforced Plastic Material Composite>
[1.1. Configuration of a Metal-Carbon Fiber Reinforced Plastic Material Composite]

First, there will be explained a configuration of a metal-carbon fiber reinforced plastic material composite according to a first embodiment of the present invention with reference to FIG. 1. FIG. 1 is a schematic view illustrating a cross-sectional structure of a metal-carbon fiber reinforced plastic material composite 1 in a lamination direction as one example of the metal-carbon fiber reinforced plastic material composite according to this embodiment.

As illustrated in FIG. 1, the metal-carbon fiber reinforced plastic material composite 1 is a composite (composite member) in which a CFRP layer 12 as one example of a carbon fiber reinforced plastic material, is bonded to at least a portion of a metal plate 11 with a coating layer 13 formed beforehand on a surface thereof, or a metal member 11A obtained by processing the metal plate 11 by press-molding or the like, on which the coating layer 13 is formed, by thermocompression bonding to be integrated. Here, "integrated" means that the metal plate 11 or the metal member 11A, the CFRP layer 12, and the coating layer 13 move as one when processed or deformed.

Hereinafter, there will be explained in detail each configuration of the metal-carbon fiber reinforced plastic material composite having such a laminated structure (to be hereinafter abbreviated as a "metal-CFRP composite").

(Metal Plate 11, Metal Member 11A)

The material, the shape, the thickness, and so on of the metal plate 11 and the metal member 11A are not particularly limited as long as they can be molded by pressing or the like, but a thin plate shape is preferable. The materials of the metal plate 11 and the metal member 11A include, for example, iron, titanium, aluminum, magnesium, and alloys of these materials. Here, examples of the alloy include iron-based alloys (including stainless steel), Ti-based alloys, Al-based alloys, Mg alloys, and so on. The material of the metal plate 11 and the metal member 11A is preferred to be a steel material, an iron-based alloy, titanium, and aluminum, and is more preferred to be a steel material having a tensile strength higher than other metal types. Examples of such a steel material include steel materials such as cold-rolled steel sheets for general use, drawing or ultra deep drawing, workable cold-rolled high-tensile steel sheets for automobiles, hot-rolled steel sheets for general use or working, hot-rolled steel sheets for automotive structure, and workable hot-rolled high-tensile steel sheets for automobile, which are specified in the Japanese Industrial Standards (JIS) and so on as thin steel sheets to be used for automobiles, and carbon steel, alloy steel, high tensile steel, and so on used for general structure or mechanical applications can also be cited as the steel materials not limited to thin plates.

The steel material may be subjected to any surface treatment. Here, examples of the surface treatment include various plating treatments such as galvanizing (hot-dip galvanizing, electrogalvanizing, and so on) and aluminum plating, conversion treatments such as a chromate treatment and a non-chromate treatment, and a physical treatment such as sandblasting and a chemical surface roughening treatment such as chemical etching, but the surface treatment is not limited to these. Moreover, alloying of plating and plural kinds of surface treatments may be performed. As the surface treatment, a treatment that is intended to impart at least rust prevention is preferably performed.

As a particularly preferable plated steel as the metal plate 11, there are cited a hot-dip galvanized steel plate, an alloyed hot-dip galvanized steel plate obtained in a manner that a zinc alloy plated steel plate or these are heat-treated to be alloyed by diffusing Fe into galvanizing, an electrogalvanized steel plate, an electro Zn—Ni plated steel plate, hot-dip Zn—Al alloy plated steel plates represented by a hot-dip Zn-5% Al alloy plated steel plate and a hot-dip 55% Al—Zn alloy plated steel plate, hot-dip Zn—Al—Mg alloy plated steel plates represented by hot-dip Zn-1 to 12% Al-1 to 4% Mg alloy plated steel plates and hot-dip 55% Al—Zn-0.1 to 3% Mg alloy plated steel plates, an alloyed Ni-plated steel plate obtained in a manner that a Ni-plated steel plate or these are heat-treated to be alloyed by diffusing Fe into Ni plating, an Al-plated steel plate, a tin-plated steel plate, a chrome-plated steel plate, and so on. The Zinc-based plated steel plates are suitable because they are excellent in corrosion resistance. Further, the alloyed hot-dip galvanized steel plate is more suitable because it has a surface roughness larger than that of other metal members and has a large number of micro unevenness, and therefore has excellent adhesion to the later-described coating layer 13.

(CFRP Layer 12)

The CFRP layer 12 includes a matrix resin 122 and a carbon fiber material 121 that is contained inside a layer formed of the matrix resin 122 to be a composite. Incidentally, it is also conceived that a part of the carbon fiber material 121 protrudes outside the layer without staying inside the layer formed of the matrix resin 122, but such a case is also included in this embodiment.

The carbon fiber material 121 is not limited in particular, but for example, both PAN-based and pitch-based carbon fiber materials can also be used, and it only needs to be selected according to the purpose or application. Further, as the carbon fiber material 121, one type of the above-described carbon fiber materials may be used alone, or plural types may be used in combination.

In CFRP used in the CFRP layer 12, as a reinforcing fiber base that serves as a base for the carbon fiber material 121, for example, a nonwoven fabric base using chopped fibers, a cloth material using continuous fibers, a unidirectional reinforcing fiber base (UD material), and the like can be used. From the viewpoint of a reinforcement effect, the cloth material or the UD material is preferably used as the reinforcing fiber base.

The matrix resin 122 is a solidified product or a cured product of a resin composition (or a crosslinkable resin composition). Here, the term "solidified product" simply means that the resin component itself has solidified, and the term "cured product" means that the resin component has been cured by adding various curing agents thereto. Incidentally, the curing agents that can be contained in the cured product also include a later-described crosslinking agent, and the above-described "cured product" includes a crosslinked cured product formed by crosslinking.

◇ Resin Composition

As the resin composition forming the matrix resin 122, a resin composition containing a phenoxy resin as a main component thereof and containing an epoxy group is used. Here, the "main component" means a component contained in 50 parts by mass or more of 100 parts by mass of all resin components. The molecular structure of the phenoxy resin is very similar to that of the epoxy resin, and thus the phenoxy resin has the same heat resistance as that of the epoxy resin, and has improved adhesiveness to the coating layer formed on the metal plate 11 or the metal member 11A and the carbon fiber material 121.

In this embodiment, the resin composition forming the matrix resin 122 may be a resin composition containing a phenoxy resin as a main component thereof and containing an epoxy resin. Further, a curing component such as an epoxy resin is added to the phenoxy resin to be copolymerized, thereby making it possible to obtain what is called a partial curable resin. Such a partial curable resin is used as the matrix resin 122, thereby making it possible to obtain a matrix resin having excellent impregnation of the carbon fiber material 121 therewith. Furthermore, thermally curing the curing component in this partial curable resin makes it possible to suppress melting or softening of the matrix resin when the matrix resin 122 in the CFRP layer 12 is exposed to high temperatures, like ordinary thermoplastic resins. The amount of the curing component added to the phenoxy resin may be determined appropriately taking into account the impregnation of the carbon fiber material 121 with the phenoxy resin, the brittleness of the CFRP layer 12, a tack time, processability, and the like. As above, using the phenoxy resin as the matrix resin 122 makes it possible to add and control the curing component with a high degree of freedom.

Incidentally, a sizing agent that blends well with the epoxy resin is often applied to the surface of the carbon fiber material 121, for example. Since the phenoxy resin has a structure very similar to that of the epoxy resin, the use of the phenoxy resin as the matrix resin 122 allows the sizing agent for the epoxy resin to be used as it is. Therefore, it is possible to increase cost competitiveness.

Further, among the thermoplastic resins, the phenoxy resin has good moldability and excellent adhesiveness to the carbon fiber material 121 or the metal plate 11 or the metal member 11A, and further the use of an acid anhydride, an isocyanate compound, caprolactam, or the like as the crosslinking agent makes it also possible to impart the same property as that of a thermosetting resin with high heat resistance to the phenoxy resin after molding. Therefore, in this embodiment, as the resin component of the matrix resin 122, it is preferable to use a solidified product or a cured product of the resin composition containing 50 parts by mass or more of the phenoxy resin with respect to 100 parts by mass of the resin component. Using such a resin composition makes it possible to firmly bond the metal plate 11 or the metal member 11A to the CFRP layer 12. The resin composition more preferably contains 55 parts by mass or more of the phenoxy resin with respect to 100 parts by mass of the resin component. The adhesive resin composition can be in the form of a powder, a liquid such as varnish, or a solid such as a film, for example.

Incidentally, the content of the phenoxy resin can be measured using infrared spectroscopy (IR: InfraRed spectroscopy) as follows. When analyzing the content of the phenoxy resin from a resin composition to be subjected to IR, a general IR analysis method such as a transmission method or an ATR reflection method can be used to measure the content of the phenoxy resin.

The CFRP layer 12 is cut out with a sharp cutting tool or the like, fibers are removed with tweezers or the like as much as possible, and a resin composition to be analyzed is sampled from the CFRP layer 12. In the case of the transmission method, a KBr powder and a powder of the resin composition to be analyzed are crushed while being uniformly mixed in a mortar or the like to fabricate a thin film as a sample. In the case of the ATR reflection method, as in the transmission method, the powders may be crushed while being uniformly mixed in a motor to fabricate a tablet as a sample, or a sample may be made in a manner that the surface of a single crystal KBr tablet (for example, 2 mm in diameter×1.8 mm in thickness) is scratched with a file or the like and a powder of the resin composition to be analyzed is sprinkled on the surface to make it adhere thereto. In either method, it is important to measure the background of a KBr simple substance before mixing with the resin to be analyzed. As an IR measuring apparatus, a commercially available general measuring apparatus can be used. As the IR measuring apparatus, it is preferable to use an apparatus that has an analytical accuracy capable of distinguishing absorbances (Absorbance) in 1% unit and capable of distinguishing wavenumbers (Wavenumber) in 1 cm$^{-1}$ unit. Examples of such an IR measuring apparatus include FT/IR-6300 manufactured by JASCO Corporation, and so on.

In the case of examining the content of the phenoxy resin, the absorption peaks of the phenoxy resin exist, for example, at 1450 to 1480 cm$^{-1}$, in the vicinity of 1500 cm$^{-1}$, in the vicinity of 1600 cm$^{-1}$, and so on, and thus it is possible to calculate the content based on the intensity of the same absorption peaks. Incidentally, these measurements can also be performed by later-described micro IR.

The "phenoxy resin" is a linear polymer obtained from the condensation reaction of a bivalent phenolic compound with an epichlorohydrin or from the polyaddition reaction of a bivalent phenolic compound with a bifunctional epoxy resin, and is an amorphous thermoplastic resin. The phenoxy resin can be obtained in a solution or under a solvent-free condition by conventional well-known methods, and can be used in the form of powder, varnish, or film. The mean molecular weight of the phenoxy resin is preferably, for example, 10,000 or more, more preferably 20,000 or more, and further preferably 30,000 or more, as a mass average molecular weight (Mw). Mw of the phenoxy resin (A) is made to fall within a range of 10,000 or more, thereby making it possible to further increase the strength of a compact, and this effect is further enhanced by setting Mw to 20,000 or more and further to 30,000 or more. On the other hand, Mw of the phenoxy resin is preferably 200,000 or less, more preferably 100,000 or less, and further preferably 80,000 or less. Mw of the phenoxy resin is set to 200,000 or less, and thereby, it can be made excellent in workability and processability, and this effect is further enhanced by setting Mw to 100,000 or less and further to 80,000 or less. Incidentally, Mw in this description is set to a value obtained by measuring Mw by gel permeation chromatography (GPC) and converting the measured value using a standard polystyrene calibration curve.

A hydroxyl equivalent (g/eq) of the phenoxy resin used in this embodiment preferably falls within a range of 50 or more and 1000 or less, for example. The hydroxyl equivalent of the phenoxy resin is set to 50 or more, thereby making it possible to improve the mechanical properties of the cured product because the water absorption rate decreases due to a decrease in the number of hydroxyl groups. On the other hand, the hydroxyl equivalent of the phenoxy resin is set to 1,000 or less, thereby making it possible to suppress the decrease in the number of hydroxyl groups, so that it is possible to improve the affinity for an adherend and improve the mechanical properties of the metal-CFRP composite 1. This effect is further enhanced by setting the hydroxyl equivalent to 750 or less and further to 500 or less. Therefore, the hydroxyl equivalent of the phenoxy resin is preferred to be 750 or less and more preferred to be 500 or less.

Further, a glass transition temperature (Tg) of the phenoxy resin is preferred to be 65° C. or more, for example. Tg of the phenoxy resin is 65° C. or more, thereby making it possible to sufficiently secure a thickness of the coating layer 13 because it is possible to prevent the flowability of the resin from increasing too much while ensuring moldability. Tg of the phenoxy resin is more preferably 70° C. or more. On the other hand, Tg of the phenoxy resin is preferred to be 150° C. or less. When Tg of the phenoxy resin is 150° C. or less, the melt viscosity decreases, and thus impregnation of the carbon reinforcing fiber base with the phenoxy resin without defects such as voids is facilitated, resulting in that it is possible to perform a lower-temperature bonding process. Incidentally, Tg of the resin in this description is a numeric value calculated from a peak value of second scanning by performing a measurement at a temperature within a range of 20 to 280° C. under a temperature increasing condition of 10° C./minute by using a differential scanning calorimetry apparatus.

The phenoxy resin is not limited in particular as long as it satisfies the above-described physical properties, but preferable examples of the phenoxy resin include bisphenol A-type phenoxy resins, (which can be obtained as, for example, Phenotohto YP-50, Phenotohto YP-50S, and Phenotohto YP-55U manufactured by NIPPON STEEL Chemical & Material Co., Ltd.), bisphenol F-type phenoxy resins, (which can be obtained as, for example, Phenotohto FX-316 manufactured by NIPPON STEEL Chemical & Material Co., Ltd.), and copolymer-type phenoxy resins of bisphenol A and bisphenol F, (which can be obtained as, for example, YP-70 manufactured by NIPPON STEEL Chemical & Material Co., Ltd.), and other than the above-described phenoxy resins, there can be cited special phenoxy resins such as brominated phenoxy resins, phosphorus-containing phenoxy resins, and sulfone group-containing phenoxy resins, (which can be obtained as, for example, Phenotohto YPB-43C, Phenotohto FX293, VPS-007, and so on manufactured by NIPPON STEEL Chemical & Material Co., Ltd.), and so on. These resins can be used alone or in a mixture of two or more types.

The thermoplastic resin used as a resin component of the matrix resin 122 is preferably one with a melt viscosity of 3,000 Pa·s or less in a temperature zone within a range of 160 to 250° C., more preferably one with a melt viscosity of 2,900 Pa·s or less, and further preferably one with a melt viscosity of 2,800 Pa·s or less. The melt viscosity in a temperature zone within a range of 160 to 250° C. becomes 3,000 Pa·s or less, and thereby the flowability during melting is improved and defects such as voids are less likely to occur in the CFRP layer 12. When the melt viscosity in a temperature zone within a range of 160 to 250° C. becomes 2,900 Pa·s or less and further becomes 2,800 Pa·s or less, this effect is further enhanced. On the other hand, the melt viscosity in a temperature zone within a range of 160 to 250° C. more preferably becomes 90 Pa·s or more and further preferably becomes 100 Pas or more. In the case of the melt viscosity being 90 Pa·s or less, due to a too small molecular weight as a resin composition, the resin composition may be embrittled, leading to a decrease in mechanical strength of the metal-CFRP composite 1. However, such a decrease in mechanical strength can be securely suppressed when the melt viscosity in a temperature zone within a range of 160 to 250° C. becomes 90 Pa·s, and such a decrease in mechanical strength can be more securely suppressed when it becomes 100 Pa·s or more.

◇ Crosslinkable Resin Composition

The crosslinkable resin composition (namely, the cured product of the resin composition) can also be formed by blending, as a crosslinking agent, for example, an acid anhydride, an isocyanate, caprolactam, or the like in a resin composition containing the phenoxy resin (to be also referred to as the "phenoxy resin (A)" below). The crosslinkable resin composition utilizes a secondary hydroxyl group contained in the phenoxy resin (A) to cause a crosslinking reaction, and thereby the heat resistance of the resin composition improves, so that it is advantageous for application to members used under higher temperature environments. For crosslinking formation using the secondary hydroxyl group of the phenoxy resin (A), a crosslinkable resin composition with a crosslinking curable resin (B) and a crosslinking agent (C) blended therein is preferably used. As the crosslinking curable resin (B), for example, an epoxy resin or the like can be used, but it is not limited in particular. Using such a crosslinkable resin composition makes it possible to obtain a cured product (the crosslinked cured product) in a second cured state with Tg of the resin composition greatly improved as compared to the case of the phenoxy resin (A) alone. Tg of the crosslinked cured product of the crosslinkable resin composition is preferred to be 160° C. or more, for example, and preferably falls within a range of 170° C. or more and 220° C. or less.

In the crosslinkable resin composition, as the crosslinking curable resin (B) to be blended in the phenoxy resin (A), a bifunctional or more epoxy resin is preferred. Examples of the bifunctional or more epoxy resin include bisphenol A-type epoxy resins, (which can be obtained as, for example, Epotohto YD-011, Epotohto YD-7011, and Epotohto YD-900 manufactured by NIPPON STEEL Chemical & Material Co., Ltd.), bisphenol F-type epoxy resins, (which can be obtained as, for example, Epotohto YDF-2001 manufactured by NIPPON STEEL Chemical & Material Co., Ltd.), diphenyl ether-type epoxy resins, (which can be obtained as, for example, YSLV-80DE manufactured by NIPPON STEEL Chemical & Material Co., Ltd.), tetramethylbisphenol F-type epoxy resins, (which can be obtained as, for example, YSLV-80XY manufactured by NIPPON STEEL Chemical & Material Co., Ltd.), bisphenol sulfide-type epoxy resins, (which can be obtained as, for example, YSLV-120TE manufactured by NIPPON STEEL Chemical & Material Co., Ltd.), hydroquinone-type epoxy resins, (which can be obtained as, for example, Epotohto YDC-1312 manufactured by NIPPON STEEL Chemical & Material Co., Ltd.), phenol novolac-type epoxy resins, (which can be obtained as, for example, Epotohto YDPN-638 manufactured by NIPPON STEEL Chemical & Material Co., Ltd.), ortho-cresol novolac-type epoxy resins, (which can be obtained as, for example, Epotohto YDCN-701, Epotohto YDCN-702, Epotohto YDCN-703, and Epotohto YDCN-704 manufactured by NIPPON STEEL Chemical & Material Co., Ltd.), aralkyl naphthalene diol novolac-type epoxy resins, (which can be obtained as, for example, ESN-355 manufactured by NIPPON STEEL Chemical & Material Co., Ltd.), triphenylmethane-type epoxy resins, (which can be obtained as, for example, EPPN-502H manufactured by Nippon Kayaku Co., Ltd.), and so on, but it is not limited to these. Further, these epoxy resins may be used alone, or in a mixture of two or more types.

Further, as the crosslinking curable resin (B), crystalline epoxy resins are preferable, which does not mean a limitation in particular, and the crystalline epoxy resin whose melting point is in a range of 70° C. or more and 145° C. or less and whose melt viscosity at 150° C. is 2.0 Pa·s or less is more preferable. Using the crystalline epoxy resin exhibiting such melting characteristics makes it possible to reduce the melt viscosity of the crosslinkable resin composition as the resin composition and improve the adhesiveness of the CFRP layer 12. When the melt viscosity exceeds 2.0 Pa·s, the moldability of the crosslinkable resin composition decreases and the homogeneity of the metal-CFRP composite 1 decreases in some cases.

Examples of the crystalline epoxy resin suitable as the crosslinking curable resin (B) include Epotohto YSLV-80XY, YSLV-70XY, YSLV-120TE, and YDC-1312 manufactured by NIPPON STEEL Chemical & Material Co., Ltd., YX-4000, YX-4000H, YX-8800, YL-6121H, YL-6640, and so on manufactured by Mitsubishi Chemical Corporation, HP-4032, HP-4032D, HP-4700, and so on manufactured by DIC Corporation, and NC-3000 and so on manufactured by Nippon Kayaku Co., Ltd.

The crosslinking agent (C) forms an ester bond with the secondary hydroxyl group of the phenoxy resin (A), to thereby crosslink the phenoxy resin (A) three-dimensionally. Therefore, unlike such strong crosslinking as curing of the thermosetting resin, the crosslinking can be broken by a hydrolysis reaction, so that the metal plate 11 or the metal member 11A and the CFRP layer 12 can be easily detached from each other. This allows the metal plate 11 and the metal member 11A to be recycled.

As the crosslinking agent (C), the acid anhydride is preferable. The acid anhydride is not limited in particular as long as it is solid at ordinary temperature and does not have sublimability very much, but from the point of imparting heat resistance to the metal-CFRP composite 1 and reactivity, an aromatic acid anhydride with two or more acid anhydrides that react with the hydroxyl group of the phenoxy resin (A) is preferred. Aromatic compounds with two acid anhydride groups, such as pyromellitic acid anhydride, are suitably used because they have a higher crosslinking density and better heat resistance than a combination of trimellitic acid anhydride and a hydroxyl group. Aromatic dianhydrides having compatibility with the phenoxy resin and the epoxy resin, such as, for example, 4,4'-oxydiphthalic acid, ethylene glycol bisanhydrotrimellitate, and 4,4'-(4,4'-isopropylidenediphenoxy) diphthalic anhydride, are more preferable because they have a large effect of improving Tg. Particularly, an aromatic dianhydride with two acid anhydride groups, such as pyromellitic acid anhydride, is suitably used because it has an improved crosslinking density and improved heat resistance as compared to phthalic anhydride with only one acid anhydride group, for example. That is, the aromatic dianhydride has two acid anhydride groups, to thus have good reactivity, and a crosslinked cured product having a sufficient strength for demolding can be obtained in a short molding time, and at the same time, due to the esterification reaction with the secondary hydroxyl group in the phenoxy resin (A), four carboxyl groups are produced, thus making it possible to increase a final crosslinking density.

The reaction of the phenoxy resin (A), the epoxy resin as the crosslinking curable resin (B), and the crosslinking agent (C) is crosslinked and cured by the esterification reaction between the secondary hydroxyl group in the phenoxy resin (A) and the acid anhydride group of the crosslinking agent (C), as well as by the reaction between the carboxyl group produced by this esterification reaction and the epoxy group of the epoxy resin. By the reaction between the phenoxy resin (A) and the crosslinking agent (C), a phenoxy resin crosslinked body can be obtained, but the coexistence of the epoxy resin reduces the melt viscosity of the resin composition, thus exhibiting excellent characteristics such as improved impregnation of the adherend (the coating layer 13), an accelerated crosslinking reaction, an improved crosslinking density, and an improved mechanical strength.

Incidentally, in the crosslinkable resin composition, the epoxy resin as the crosslinking curable resin (B) coexists, but it is conceived that the phenoxy resin (A), which is a thermoplastic resin, is the main component, and the esterification reaction between the secondary hydroxyl group of the phenoxy resin (A) and the acid anhydride group of the crosslinking agent (C) has priority. That is, the reaction between the acid anhydride used as the crosslinking agent (C) and the epoxy resin used as the crosslinking curable resin (B) takes time (a reaction rate is slow), and thus, the reaction between the crosslinking agent (C) and the secondary hydroxyl group of the phenoxy resin (A) occurs first, and then the crosslinking agent (C) remaining from the previous reaction or the remaining carboxyl group derived from the crosslinking agent (C) reacts with the epoxy resin, and thereby the crosslinking density is further increased. Therefore, unlike the resin composition containing, as a main component thereof, the epoxy resin, which is a thermosetting resin, the crosslinked cured product obtained from the crosslinkable resin composition is a thermoplastic resin and has excellent storage stability.

In the crosslinkable resin composition using the crosslinking of the phenoxy resin (A), the crosslinking curable resin (B) is preferably contained so as to be 5 parts by mass or more with respect to 100 parts by mass of the phenoxy resin (A). When the content of the crosslinking curable resin (B) is 5 parts by mass or more, it becomes easy to obtain an effect of improving the crosslinking density by the addition of the crosslinking curable resin (B), the crosslinked cured product of the crosslinkable resin composition is more likely to exhibit Tg of 160° C. or more, and the flowability is further improved. This effect is further enhanced by setting the content of the crosslinking curable resin (B) to 9 parts by mass or more and further to 10 parts by mass or less. Therefore, the content of the crosslinking curable resin (B) is preferably 9 parts by mass or more and further preferably 10 parts by mass or more. On the other hand, the crosslinking curable resin (B) is preferably contained so that the content becomes 85 parts by mass or less. When the content of the crosslinking curable resin (B) is 85 parts by mass or less, a curing time of the crosslinking curable resin (B) can be shortened, so that it becomes easy to obtain the strength necessary for demolding in a short time, and further, the recyclability of the CFRP layer 12 improves. This effect is further enhanced by setting the content of the crosslinking curable resin (B) to 83 parts by mass or less and further to 80 parts by mass or less. Therefore, the content of the crosslinking curable resin (B) is preferably 83 parts by mass or less and further preferably 80 parts by mass or less. Incidentally, the content of the crosslinking curable resin (B) can be measured by measuring the peaks derived from the epoxy resin similarly by the method using IR as above.

The blending amount of the crosslinking agent (C) is generally preferred to be the amount where the content of the acid anhydride group is 0.6 mol or more with respect to 1 mol of the secondary hydroxyl group of the phenoxy resin (A). When the content of the acid anhydride group in the crosslinking agent (C) is 0.6 mol or more, the crosslinking density increases, and thus the mechanical properties and the heat resistance are more excellent. This effect is further enhanced by setting the content of the acid anhydride group to 0.7 mol or more and further to 1.1 mol or more. Therefore, the blending amount of the crosslinking agent (C) is more preferred to be the amount where the content of the acid anhydride group is 0.7 mol or more and is further preferred to be the amount where the content of the acid anhydride group is 1.1 mol or more. On the other hand, the blending amount of the crosslinking agent (C) is preferred to be the amount where the content of the acid anhydride group is 1.3 mol or less with respect to 1 mol of the secondary hydroxyl group of the phenoxy resin (A). When the content of the acid anhydride group is 1.3 mol or less, it is possible to prevent unreacted acid anhydrides or carboxyl groups from adversely affecting the curing characteristics or crosslinking density. Therefore, the blending amount of the crosslinking curable resin (B) is preferably adjusted according to the blending amount of the crosslinking agent (C). Concretely, for example, for the purpose of causing the carboxyl group formed by the reaction between the secondary hydroxyl group of the phenoxy resin (A) and the acid anhydride group of the crosslinking agent (C) to react with the epoxy resin used as the crosslinking curable resin (B), the blending amount of the epoxy resin may be set to fall within a range of 0.5 mol or more and 1.2 mol or less at the equivalent ratio of the crosslinking agent (C). Preferably, the equivalent ratio of the crosslinking agent (C) and the epoxy resin falls within a range of 0.7 mol or more and 1.0 mol or less.

The crosslinkable resin composition can be obtained by blending the crosslinking agent (C) with the phenoxy resin (A) and the crosslinking curable resin (B), but an accelerating agent (D) serving as a catalyst may be further added so that the crosslinking reaction is performed securely. The accelerating agent (D) is not particularly limited as long as it is solid at ordinary temperature and has no sublimability, and examples thereof include tertiary amines such as triethylenediamine, imidazoles such as 2-methylimidazole, 2-phenylimidazole, and 2-phenyl-4-methylimidazole, organic phosphines such as triphenylphosphine, tetraphenylboron salts such as tetraphenylphosphonium tetraphenylborate, and so on. These accelerating agents (D) may be used alone, or in a combination of two or more types. Incidentally, in the case where the crosslinkable resin composition is made into a fine powder and the fine powder is made to adhere to the reinforcing fiber base by using a powder coating method in an electrostatic field to form the matrix resin 122, as the accelerating agent (D), an imidazole-based latent catalyst that is solid at ordinary temperature, which has a catalyst activity temperature of 130° C. or more, is preferably used. When the accelerating agent (D) is used, the blending amount of the accelerating agent (D) is preferably set to fall within a range of 0.1 parts by mass or more and 5 parts by mass or less with respect to 100 parts by mass of the total amount of the phenoxy resin (A), the crosslinking curable resin (B), and the crosslinking agent (C).

The crosslinkable resin composition is solid at ordinary temperature, and as for its melt viscosity, the minimum melt viscosity, which is the lower limit value of the melt viscosity in a temperature zone within a range of 160 to 250° C., is preferred to be 3,000 Pa·s or less, more preferred to be 2,900 Pa·s or less, and further preferred to be 2,800 Pa·s or less. The minimum melt viscosity in a temperature zone within a range of 160 to 250° C. is set to 3,000 Pa·s or less, thereby making it possible to sufficiently impregnate the adherend with the crosslinkable resin composition at the time of thermocompression bonding by heat pressing or the like and suppress generation of defects such as voids in the CFRP layer 12, and thus the mechanical properties of the metal-CFRP composite 1 improve. This effect is further enhanced by setting the minimum melt viscosity in a temperature zone within a range of 160 to 250° C. to 2,900 Pa·s and further to 2,800 Pa·s or less.

Into the resin composition (including the crosslinkable resin composition) for forming the matrix resin 122, there may be blended, for example, natural rubber, synthetic rubber, an elastomer, and so on, various inorganic fillers, a solvent, an extender, a coloring agent, an antioxidant, an ultraviolet inhibitor, a flame retardant, a flame retardant auxiliary, and so on, and other additives within a range not impairing the adhesiveness and the physical properties.

In the metal-CFRP composite 1, the matrix resin 122 of the CFRP layer 12 and the resin forming the coating layer 13 may be the same resin or different resins. However, from the viewpoint of sufficiently ensuring the adhesiveness between the CFRP layer 12 and the coating layer 13, it is preferred to select the same resin or the same type of resin as that forming the resin that forms the coating layer 13, or a resin species whose ratio of polar groups contained in a polymer, and so on are similar. Here, the "same resin" means that it is made up of the same components and further has the same composition ratio, and the "same type of resin" means that the composition ratio may be different as long as the main component is the same. The "same resin" is included in the "same type of resin." Incidentally, in the "resin component," the thermoplastic resin and the thermosetting resin are included, but non-resin components such as the crosslinking agent are not included.

In the metal-CFRP composite 1, the CFRP layer 12 is formed using at least one or more CFRP molding prepregs. According to the desired thickness of the CFRP layer 12, the number of CFRP molding prepregs to be laminated can be selected.

(Coating Layer 13)

The coating layer 13 is arranged between the metal plate 11 or the metal member 11A and the CFRP layer 12 in the metal-CFRP composite 1, and is a layer that bonds them together. This coating layer 13 is present on the surface of at least a portion of the metal plate 11 or the metal member 11A, and contains a predetermined resin as a main component thereof and contains an isocyanate group. In this embodiment, when producing the metal-CFRP composite 1, the epoxy group in the phenoxy resin, which is the matrix resin of the CFRP layer 12, and an unreacted isocyanate present in the coating layer 13 are chemically bonded to form bonds (primary bonds) as represented in the following (structural formula 1) in the vicinity of the interface between the CFRP layer 12 and the coating layer 13, and thereby strong adhesion is exhibited. Incidentally, the above-described unreacted isocyanate is a blocked isocyanate, which is an isocyanate in which the isocyanate group is protected by a blocking agent. The presence of such a blocked isocyanate as above in the coating layer 13 properly activates the isocyanate group of the blocked isocyanate during the forming process of the coating layer 13 and during the bonding process between the coating layer 13 and the CFRP layer 12 (in other words, the reaction process between the unreacted isocyanate and the epoxy group), respectively. As a result, the metal-CFRP composite 1 according to this embodiment comes to have the isocyanate group in the coating layer 13. Further, the metal-CFRP composite 1 according to this embodiment has the following chemical bonds in the vicinity of the interface between the coating layer 13 and the CFRP layer 12, which provides, in addition to the adhesion at the interface, excellent adhesion durability at the interface under a degradation environment through water and water vapor. Particularly, the effect of improving the adhesion at the interface is significant. Here, in the following (structural formula 1), $R_1$ represents an epoxy side chain and $R_2$ represents an isocyanate side chain.

[Chemical formula 2]

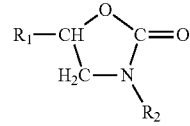

(Structural formula 1)

There will be explained the decrease in adhesion under a degradation environment through water and water vapor and the mechanism in which the adhesion adhesion durability improve through the formation of chemical bonds. In general, except for the compatibilization of resins, adhesion at the interface of resins is exhibited by resin end groups of respective coating layers being hydrogen bonded to each other at the interface. This hydrogen bond is classified as a secondary bond, which is an electrostatic interaction similar to the Van der Waals force, but has a higher interaction than the Van der Waals force and can exhibit stronger adhesion. On the other hand, under the degradation environment through water and water vapor, water is infiltrated into the vicinity of the interface, to thereby cause the hydrogen bond between the resins to switch to a bond between the water and the resin, resulting in a decrease in the adhesion at the interface. Even under such an environment, the chemical bonds as above are formed at the interface, and thus, the bonds are not broken even under the degradation environment through water and water vapor, resulting in that it is possible to maintain good adhesion without impairing the adhesion.

In order to exhibit such chemical bonds as above, regarding the CFRP layer 12, the phenoxy resin, which is a thermoplastic resin having epoxy groups, is used as the above-described matrix resin 122. Further, regarding the coating layer 13, a binder resin 131 and an uncrosslinked isocyanate need to be present in the coating layer 13 at least prior to thermocompression bonding of CFRP. By the presence of the uncrosslinked isocyanate, it becomes possible that, when the phenoxy resin is subjected to thermocompression bonding, the blocking agent of the blocked isocyanate is removed by heat and the epoxy group in the phenoxy resin in contact with the coating layer 13 and the isocyanate group in the coating layer 13 are chemically bonded. The blocked isocyanate in the coating layer 13 and the epoxy group in the CFRP layer 12 are chemically bonded, to thereby cause the chemical bonds represented in the above (structural formula 1) to be present in the vicinity of the CFRP interface.

Generally, the isocyanate has high reactivity, to thus be present in the form of blocked isocyanate blocked by a blocking agent at a coating material stage prior to film formation. Blocking agents differ in dissociation temperature depending on the type, and when heated to a predetermined temperature, the blocking agent is dissociated, allowing the isocyanate to react with an end functional group of the resin to be crosslinked. At this time, an amount of the blocked isocyanate, which is equivalent to the functional group of the resin, is contained, and thereby a coating layer having no unreacted isocyanate is formed.

In order to make the unreacted isocyanate remain in the coating layer, the following two methods are considered. The first method is a method to contain a blocked isocyanate in excess of the equivalent to the functional group of the resin. The second method is a method to form the coating layer at a temperature that is equal to or less than the temperature at which the blocking agent is dissociated when the coating layer is formed. Either the first method or the second method may be used to make the unreacted isocyanate remain in the coating layer 13. However, in the first method, the blocking agent is dissociated when the coating layer is formed, and depending on the heating temperature when the coating layer is formed, the unreacted isocyanate may volatilize. Further, in the second method, there is a possibility that the coating layer itself is not able to cause a crosslinking reaction, failing to form a good coating film, but by blending blocked isocyanates with different dissociation temperatures and performing baking at a temperature at which only the blocking agent with a low dissociation temperature is dissociated, it becomes possible to efficiently make the unreacted isocyanates remain. Details of the first method and the second method will be explained below again.

The type of the blocked isocyanate is not specified in particular. However, when a solvent-based resin is used as the binder resin 131 of the coating layer 13, a solvent-soluble type blocked isocyanate is preferable, and when a water-dispersible resin is used, it is preferable to use a water-based blocked isocyanate.

The amount of the unreacted blocked isocyanate in the coating layer 13 is set to the amount sufficient to ensure a bonding amount of the bonds represented in the above (structural formula 1) necessary for obtaining a desired adhesion strength in the vicinity of the interface between the CFRP layer 12 and the coating layer 13 as will be described in detail below.

As an indication of the amount that can ensure such a required bonding amount as above, it can be said that the following conditions based on the results of measurements using the Fourier transform infrared spectroscopy are satisfied.

Figure 2:
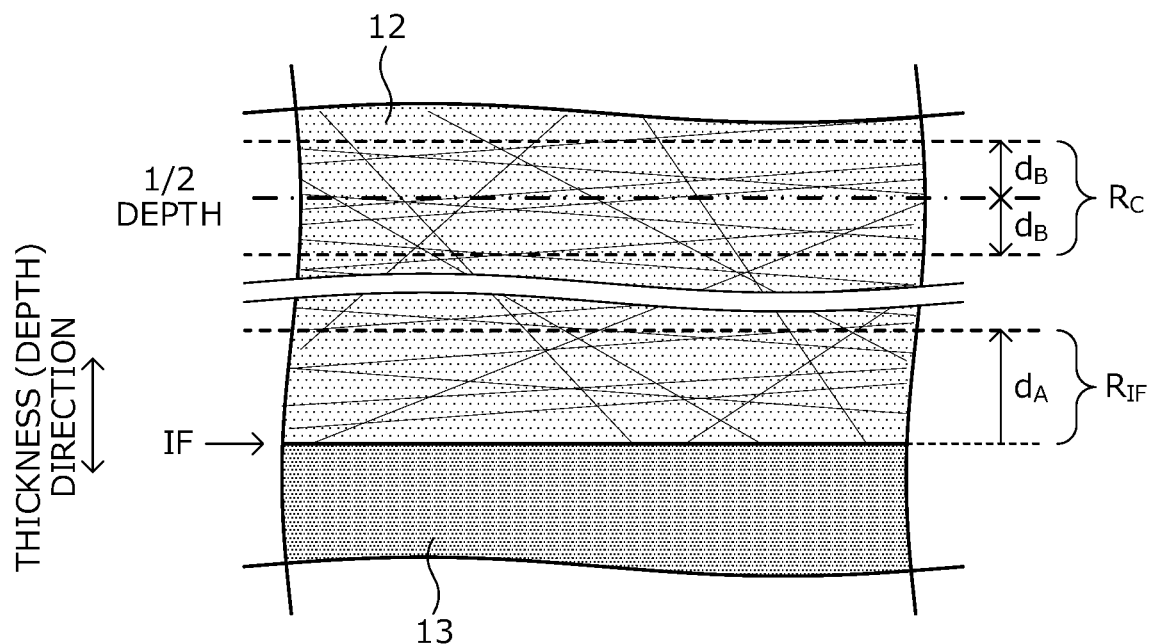
FIG. 2 is an explanatory view for explaining the metal-carbon fiber reinforced plastic material composite according to the same embodiment.

That is, as schematically illustrated in FIG. 2, a region from an interface IF between the CFRP layer 12 and the coating layer 13 to $d_A$=20 μm in the thickness direction toward the CFRP layer 12 side is defined as an interface vicinity region $R_{IF}$, and a region up to $d_B$=10 μm from the middle of the CFRP layer 12 in the thickness direction (a position corresponding to ½ depth) is defined as a middle vicinity region $R_C$. In this case, the interface vicinity region $R_{IF}$ and the middle vicinity region $R_C$ are each observed by the Fourier transform infrared spectroscopy.

In this case, it is preferable that peaks P1 to P3 exist in the following wavenumber bands in an obtained infrared absorption spectrum, and peak intensities I1 to I3 of the peaks P1 to P3 in each of the wavenumber bands satisfy the relationships expressed in the following expression (1) and expression (2). The existence of the peaks P1 to P3 in the following wavenumber bands indicates that the chemical bonds represented in the above (structural formula 1) exist the interface vicinity region $R_{IF}$. Further, the relationships expressed in the following expression (1) and expression (2) are satisfied, which indicates that the bonding amount of the chemical bonds represented in the above (structural formula 1), which is necessary for obtaining a desired adhesion strength, is achieved in the interface vicinity region $R_{IF}$.

P1: 3660 cm$^{-1}$ to 3570 cm$^{-1}$
P2: 1200 cm$^{-1}$ to 1050 cm$^{-1}$
P3: 1750 cm$^{-1}$ to 1715 cm$^{-1}$ $$(I2_{IF}/I1_{IF}) \geq 1.5 \times (I2_C/I1_C) \quad \text{expression (1)}$$

$$(I3_{IF}/I1_{IF}) \geq 1.5 \times (I3_C/I1_C) \quad \text{expression (2)}$$

In the above expression (1) and expression (2), a subscript IF indicates the peak when the interface vicinity is observed, and a subscript C indicates the peak when the middle vicinity is observed. Further, in the above expression (1) and expression (2), it is preferable to set the peak intensities I1 to I3 of the peaks P1 to P3 to a peak height from a baseline defined by a portion other than the peaks.

Here, the above-described peak P1 is the peak of O—H stretching vibration, which is characteristically observed in the case where a general epoxy-amine bond ($R_a$—CH(OH)—CH$_2$—NH—R$_b$, $R_a$: epoxy side chain, $R_b$: amine side chain) is present. Further, the above-described peak P2 is the peak of C—O—C stretching vibration characteristically observed in the chemical bonds represented in the above (structural formula 1), and the above-described peak P3 is the peak of C=O stretching vibration characteristically observed in the chemical bonds represented in the above (structural formula 1). When measuring the CFRP layer 12, it is preferable to select the matrix resin portion for measurement because the peak intensity obtained by measuring the carbon fiber material portion decreases.

Incidentally, in the above expression (1), a greater value of ($I2_{IF}/I1_{IF}$) is better relative to the value of ($I2_C/I1_C$), the value of ($I2_{IF}/I1_{IF}$) is more preferable to be equal to or more than twice the value of ($I2_C/I1_C$), and is further preferable to be equal to or more than three times the value of ($I2_C/I1_C$). When such a relationship is satisfied, the bonding amount of the chemical bonds represented in the above (structural formula 1) is more securely brought into a desired state.

Further, in the above expression (2), a greater value of ($I3_{IF}/I1_{IF}$) is better relative to the value of ($I3_C/I1_C$), the value of ($I3_{IF}/I1_{IF}$) is more preferable to be equal to or more than twice the value of ($I3_C/I1_C$), and is further preferable to be equal to or more than three times the value of ($I3_C/I1_C$). When such a relationship is satisfied, the bonding amount of the chemical bonds represented in the above (structural formula 1) is more securely brought into a desired state.

In the meantime, in the above expression (1), the value of ($I2_{IF}/I1_{IF}$) does not exceed five times the value of ($I2_C/I1_C$) even if many of the chemical bonds represented in the above (structural formula 1) are present in the interface vicinity. Thus, in the above expression (1), the value of ($I2_{IF}/I1_{IF}$) is equal to or less than five times the value of ($I2_C/I1_C$) practically.

Further, in the above expression (2), the value of ($I3_{IF}/I1_{IF}$) does not exceed five times the value of ($I3_C/I1_C$) even if many of the chemical bonds represented in the above (structural formula 1) are present in the interface vicinity. Thus, in the above expression (2), the value of $(I3_{IF}/I1_{IF})$ is equal to or less than five times the value of $(I3_C/I1_C)$ practically.

Incidentally, in the measurement by the Fourier transform infrared spectroscopy, it is preferable to perform the measurement by a micro-ATR method capable of measuring a micro region in consideration of such a measurement range as above.

The thickness of the coating layer 13 is preferred to be 0.2 μm or more, for example. The thickness of the coating layer 13 is set to 0.2 μm or more, thereby making it possible to more securely ensure the absolute amount of the unreacted isocyanate present in the coating layer 13 and more securely cause a sufficient amount of the bonds to the epoxy group at the interface. The thickness of the coating layer 13 is more preferably 0.4 μm or more. On the other hand, the thickness of the coating layer 13 is preferred to be 10 μm or less. The thickness of the coating layer 13 is set to 10 μm or less, thereby making it possible to ensure better cost and improve processability while easily controlling the amount of the unreacted isocyanate. The thickness of the coating layer 13 is more preferably 5 μm or less.

As the binder resin 131 of the coating layer 13, it is preferable to use, for example, a water-dispersible resin. The water-dispersible resin is suitable for using blocked isocyanates with different dissociation temperatures because the main component of the solvent is water, making it possible to lower the temperature at a baking time as compared to a solvent-based resin.

Examples of the water-dispersible resin include water-soluble or water-dispersible resins such as a polyester resin, a urethane resin, an acrylic resin, an epoxy resin, a phenolic resin, and a mixed resin of two or more of these resins. A particularly preferable water-dispersible resin is at least one of a polyester resin and a urethane resin.

When a polyester resin is used, its average molecular weight is preferred to fall within a range of 10,000 to 30,000 as a mass average molecular weight (Mw). The average molecular weight is 10,000 or more as Mw, thereby making it possible to more securely ensure sufficient processability. Mw of the polyester resin is more preferably 12,000 or more. Further, the average molecular weight is 30,000 or less as Mw, thereby making it possible to suppress a decrease in the number of functional groups in the resin itself and more securely ensure excellent adhesion of a coating film. Mw of the polyester resin is more preferably 20,000 or less.

When a urethane resin is used, a preferable form of the urethane resin is the form of an emulsion having an emulsion average particle size of 10 nm or more. The average particle size of the emulsion is 10 nm or more, thereby making it possible to more securely suppress an increase in cost. The average particle size of the emulsion is more preferably 20 nm or more. In the meantime, a preferable form of the urethane resin is the form of an emulsion having an emulsion average particle size of 100 nm or less. The average particle size of the emulsion is 100 nm or less, thereby making it possible to more securely suppress an increase in gap between emulsions when they are formed into a coating film and more securely suppress a decrease in a barrier property as a resin coating film. The average particle size of the emulsion is more preferably 60 nm or less. Examples of the type of urethane resin include ether-based, polycarbonate-based, ester-based, acrylic graphite types, and so on. These various urethane resins may be used alone or in combination.

Here, the binder resin 131 of the coating layer 13 means a resin component that forms a coating framework present in the coating layer 13, and is referred to as the binder resin even if pigments and the like are not contained.

In this embodiment, an adhesion-imparting agent such as a silane coupling agent may be further contained in the coating layer 13 in order to improve the adhesion to the metal plate 11 or the metal member 11A. Examples of the silane coupling agent include those containing organic functional groups of an epoxy system, an amino system, a vinyl system, a chlor system, a methacryloxy system, a mercapto system, and a cationic system. Concrete examples of such a silane coupling agent include vinylethoxysilane, vinylmethoxysilane, N-(2-aminomethyl)3-aminopropylmethyldimethoxysilane, N-(2-aminomethyl)3-aminopropyltrimethoxysilane, 3-aminopropyltrimethoxysilane, 3-glycidoxypropyltrimethoxysilane, 3-glycidoxypropylmethyldimethoxysane, 2-(3,4-epoxycyclohexyl)ethyltrimethoxysilane, 3-methacryloxypropyltrimethoxysilane, 3-mercaptopropyltrimethoxysilane, tetraethoxysilane, and tetramethoxysilane, but the silane coupling agent is not limited to these. A particularly preferable silane coupling agent is a silane coupling agent having epoxy groups, which is further excellent in the adhesion to the metal plate 11 or the metal member 11A.

In this embodiment, various pigments and the like may be further contained in the coating layer 13. For example, an antirust pigment is contained in the coating layer 13, thereby making it possible to improve corrosion resistance. For example, a conductive pigment is contained in the coating layer 13, thereby making it possible to impart spot weldability and electrodeposition paintability. For example, an extender pigment is contained in the coating layer 13, thereby making it possible to improve an elastic modulus of the coating layer 13 and reduce a binder resin ratio, resulting in that it is possible to reduce the cost of the coating layer 13. For example, a hydrophobic pigment is contained in the coating layer 13, thereby making it possible to suppress infiltration of water or an aqueous electrolyte into the coating layer 13.

The antirust pigment is not particularly limited and can be any antirust pigment as long as it is an antirust pigment effective against the corrosion of commonly used metal plates. However, as such an antirust pigment, it is preferable to use at least one type of antirust pigment selected from the group consisting of, for example, aluminum tripolyphosphate, Zn, Mg, Al, Ti, Zr and Ce salts of phosphoric acid and phosphorous acid, hydrocalumite-treated phosphoric acid compounds (as an example, EXPERT NP-530 N5 manufactured by Toho Ganryo Kogyo Co., Ltd., which is hydrocalumite-treated zinc phosphate), Ca ion exchange silica, and amorphous silica with an oil absorption of 100 to 1000 ml/100 g, a specific surface area of 200 to 1000 m$^2$/g, and an average particle size of 2 to 30 μm.

Examples of the conductive pigment include well-known conductive particles such as non-oxide ceramic particles, doped metal oxide particles, iron alloy particles, stainless steel particles, and particles other than iron alloys (metal particles, metal alloy particles, and so on). Among them, vanadium-based non-oxide ceramic particles such as vanadium boride and vanadium nitride, and doped zinc oxide particles in which aluminum is doped into zinc oxide are more preferable because they contribute to improving corrosion resistance as well as imparting conductivity.

Examples of the extender pigment include calcium carbonate, barium sulfate, aluminum oxide, titanium oxide, and so on.

Examples of the hydrophobic pigment include hydrophobic silica, hydrophobic titania, hydrophobic alumina, and so on.

The content of each of such various pigments as above is preferred to be 5 mass % or more with respect to the total solid content of the coating layer 13. The content of each of the various pigments is set to 5 mass % or more with respect to the total solid content of the coating layer 13, thereby making it possible to more securely exhibit the effect obtained by containing the pigment. On the other hand, the content of each of the various pigments is preferably set to less than 60 mass % with respect to the total solid content of the coating layer 13. The content of each of the various pigments is set to less than 60 mass % with respect to the total solid content of the coating layer 13, thereby making it possible to more securely suppress brittleness of the coating layer 13 and occurrence of a cohesive failure in the coating layer 13. Further, different types of pigments may be contained, but if the total added amount is 60 mass % or more, the coating layer 13 may become brittle to cause a cohesive failure to occur in the coating layer 13.

The average particle size of the various pigments preferably falls within a range equivalent to the thickness of the coating layer 13. In the case where the average particle size of the various pigments is extremely large relative to the thickness of the coating layer 13, these pigments may be detached during processing to cause defects in the coating layer 13, and the detached pigments may accumulate on a mold to cause mold wear damage. Incidentally, the lower limit of the average particle size of the various pigments is not defined in particular, but in the case where the average particle size is less than 10 nm, there is a possibility that the cost of the pigments increases, and at the same time, coating material viscosity when forming the coating layer 13 increases.

Incidentally, the thickness of the coating layer 13, the pigment composition, and the average particle size can be found by various methods at the stage of coating material production and film fabrication, but when finding them from the obtained composite 1, they can be found by fabricating a cross-sectional embedded sample and performing measurements by SEM•EDS (scanning electron microscope and energy dispersive X-ray spectroscopy).

For example, the thickness of the coating layer 13 can be measured by analyzing an arbitrary cross section of the fabricated cross-sectional embedded sample by the SEM•EDS and subjecting the result to an image analysis. At this time, 10 points are analyzed in each one visual field, and the average value of analysis results of the 50 points obtained from a total of five visual fields is set as the thickness of the coating layer 13.

Further, the pigment composition is set to a pigment composition resulting from subjecting a coating portion of an arbitrary cross section of the fabricated cross-sectional embedded sample to an elemental analysis by the SEM•EDS. Incidentally, when measuring by the SEM•EDS, 10 points are analyzed in each one visual field, and the average value of analysis results of the 50 points obtained from a total of five visual fields is set as the content of each element.

Furthermore, the average particle size of the pigment can be measured from a plane distribution photograph obtained by subjecting a coating portion of an arbitrary cross section of the fabricated cross-sectional embedded sample to an elemental analysis by the SEM•EDS to create a plane distribution photograph of components contained in the pigment. At this time, 10 points are analyzed in each one visual field, and the average value of analysis results of the 50 points obtained from a total of five visual fields is set as the average particle size of the pigment.

The metal-carbon fiber reinforced plastic material composite 1 according to the first embodiment of the present invention has been explained in detail above.

Second Embodiment

There will be briefly explained a metal-carbon fiber reinforced plastic material composite 2 according to a second embodiment of the present invention with reference to FIG. 3 below. Incidentally, in the following, the explanation will be made based on the differences from the metal-carbon fiber reinforced plastic material composite 1 according to the first embodiment of the present invention, and detailed examinations of the points common to the metal-carbon fiber reinforced plastic material composite 1 according to the first embodiment will be omitted.

Figure 3:
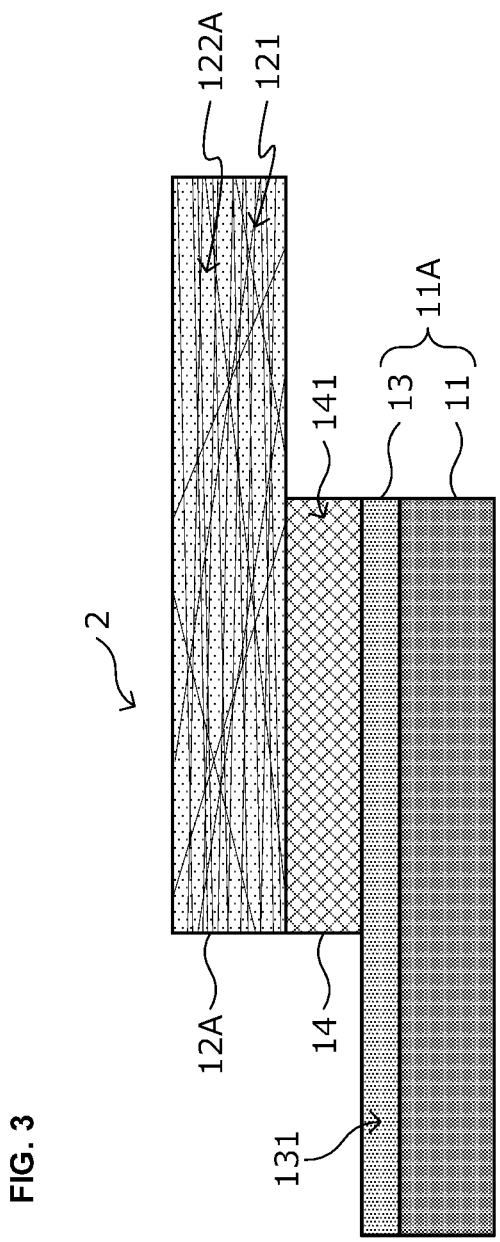
FIG. 3 is a schematic view of a cross section of a metal-carbon fiber reinforced plastic material composite according to a second embodiment of the present invention in a lamination direction.

The metal-carbon fiber reinforced plastic material composite 2 according to this embodiment is a composite member, as illustrated in FIG. 3, in which a CFRP layer 12A is bonded to at least a portion of the metal plate 11 with the coating layer 13 formed beforehand on a surface thereof, or the metal member 11A obtained by processing the metal plate 11 by press molding or the like, on which the coating layer 13 is formed, via a second coating layer 14, to be baked.

Here, the metal plate 11, the metal member 11A, and the coating layer 13 are the same as in the first embodiment, and thus their detailed explanations are omitted below.

(CFRP Layer 12A)

The CFRP layer 12A includes a matrix resin 122A and a carbon fiber material 121 contained in the matrix resin 122A to be a composite. The carbon fiber material 121 is the same as in the first embodiment, and thus, its detailed explanation is omitted.

A thermosetting resin and a thermoplastic resin both can be used for a resin composition forming the matrix resin 122A, but the thermoplastic resin is preferred to be the main component. As the type of the thermoplastic resin that can be used for the matrix resin 122A, there can be cited one type or more selected from, for example, a phenoxy resin, polyolefin and its acid modified product, polystyrene, polymethyl methacrylate, AS resin, ABS resin, thermoplastic aromatic polyesters such as polyethylene terephthalate and polybutylene terephthalate, polycarbonate, polyimide, polyamide, polyamideimide, polyetherimide, polyethersulfone, polyphenyleneether and its modified product, polyphenylene sulfide, polyoxymethylene, polyarylate, polyetherketone, polyetheretherketone, polyetherketoneketone, nylon, and so on. Incidentally, the "thermoplastic resin" also includes resins that can be a crosslinked cured product in a later-described second cured state. Further, as the thermosetting resin that can be used for the matrix resin 122, there can be cited one type or more selected from, for example, an epoxy resin, a vinylester resin, a phenolic resin, and a urethane resin.

Here, in the case where the matrix resin 122A contains the thermoplastic resin, it is possible to solve the above-described problems caused when using the thermosetting resin for the matrix resin 122A of the CFRP layer 12A (namely, the problems of the CFRP layer 12A being brittle, the tact time being long, failing to perform bending, and so on). However, the thermoplastic resin usually has high viscosity when melted, which fails to impregnate the carbon fiber material 121 therewith in a low viscosity state like the thermosetting resin such as an epoxy resin before thermosetting, and therefore has inferior impregnation of the carbon fiber material 121. Therefore, it is impossible to increase a volume fraction (VF) in the CFRP layer 12A as in the case where the thermosetting resin is used as the matrix resin 122A. In the case where the epoxy resin is used as the matrix resin 122A, for example, VF can be made about 60%, but in the case where the thermoplastic resin such as polypropylene or nylon is used as the matrix resin 122A, VF becomes about 50%. Further, when the thermoplastic resin such as polypropylene or nylon is used, the CFRP layer 12A fails to have high heat resistance as in the case where the thermosetting resin such as an epoxy resin is used.

As the matrix resin 122A, the epoxy resin is particularly preferred as the thermosetting resin, and the phenoxy resin is particularly preferred as the thermoplastic resin. This is because these resins are excellent in heat resistance, have epoxy groups, and are excellent in adhesion to the later-described second coating layer 14.

(Second Coating Layer 14)

The second coating layer 14 contains, as a binder resin 141, a binder resin that contains a thermosetting epoxy resin as a main component thereof. This is because the thermosetting epoxy resin has epoxy groups excellent in adhesion, thereby making it possible to chemically bond with uncrosslinked isocyanates present in the coating layer 13 formed in the upper layer of the metal plate 11 or the metal member 11A to form the bonds represented in the above (structural formula 1), and thus it becomes possible to exhibit excellent adhesion. Such a second coating layer 14 may also contain various adhesion-imparting agents and various pigments similarly to the coating layer 13.

Also at the interface between such a second coating layer 14 and the coating layer 13, similarly to the first embodiment, the interface vicinity region $R_{IF}$ and the middle vicinity region $R_C$ are considered. Preferably, the peaks P1 to P3 exist in the following wavenumber bands in an infrared absorption spectrum obtained when observing each of these interface vicinity region $R_{IF}$ and middle vicinity region $R_C$ by the Fourier transform infrared spectroscopy, and the peak intensities I1 to I3 of the peaks P1 to P3 in each of the wavenumber bands satisfy the relationships expressed in the following expression (1) and expression (2). Incidentally, the interface vicinity region $R_{IF}$ and the middle vicinity region $R_C$ in this embodiment can be defined in the same manner by reading the "CFRP layer 12" as the "second coating layer 14" in the explanation of the relevant part according to the first embodiment and in FIG. 2. Further, the measuring method of the infrared absorption spectrum is also the same as that in the first embodiment.

P1: 3660 $cm^{-1}$ to 3570 $cm^{-1}$
P2: 1200 $cm^{-1}$ to 1050 $cm^{-1}$
P3: 1750 $cm^{-1}$ to 1715 $cm^{-1}$ $$(I2_{IF}/I1_{IF}) \geq 1.5 \times (I2_C/I1_C) \quad \text{expression (1)}$$

$$(I3_{IF}/I1_{IF}) \geq 1.5 \times (I3_C/I1_C) \quad \text{expression (2)}$$

Incidentally, in the above expression (1), a greater value of $(I2_{IF}/I1_{IF})$ is better relative to the value of $(I2_C/I1_C)$, the value of $(I2_{IF}/I1_{IF})$ is more preferable to be equal to or more than twice the value of $(I2_C/I1_C)$, and is further preferable to be equal to or more than three times the value of $(I2_C/I1_C)$. When such a relationship is satisfied, the bonding amount of the chemical bonds represented in the above (structural formula 1) is more securely brought into a desired state.

Further, in the above expression (2), a greater value of $(I3_{IF}/I1_{IF})$ is better relative to the value of $(I3_C/I1_C)$, the value of $(I3_{IF}/I1_{IF})$ is more preferable to be equal to or more than twice the value of $(I3_C/I1_C)$, and is further preferable to be equal to or more than three times the value of $(I3_C/I1_C)$. When such a relationship is satisfied, the bonding amount of the chemical bonds represented in the above (structural formula 1) is more securely brought into a desired state.

In the meantime, in the above expression (1), the value of $(I2_{IF}/I1_{IF})$ does not exceed five times the value of $(I2_C/I1_C)$ even if many of the chemical bonds represented in the above (structural formula 1) are present in the interface vicinity. Thus, in the above expression (1), the value of $(I2_{IF}/I1_{IF})$ is equal to or less than five times the value of $(I2_C/I1_C)$ practically.

Further, in the above expression (2), the value of $(I3_{IF}/I1_{IF})$ does not exceed five times the value of $(I3_C/I1_C)$ even if many of the chemical bonds represented in the above (structural formula 1) are present in the interface vicinity. Thus, in the above expression (2), the value of $(I3_{IF}/I1_{IF})$ is equal to or less than five times the value of $(I3_C/I1_C)$ practically.

The thickness of the second coating layer 14 is preferred to be 100 μm or more. The second coating layer 14 is applied formed after the metal member 11A is molded, but the thickness of the second coating layer 14 is set to 100 μm or more, thereby making it possible to form the second coating layer 14 in a preferable state with no variations in thickness, regardless of the surface state of the molded metal member 11. The thickness of the second coating layer 14 is more preferred to be 200 μm or more. On the other hand, the thickness of the second coating layer 14 is preferred to be 1000 μm or less. The thickness of the second coating layer 14 is set to 1000 μm or less, and thereby, the area of the second coating layer 14 that is in contact with water and water vapor does not become too large, enabling more secure suppression of the decrease in durability. The thickness of the second coating layer 14 is preferred to be 750 μm or less.

Incidentally, the thickness of the second coating layer 14 can be found by various methods at the stage of film fabrication, but when finding it from the obtained composite 2, it can be found by fabricating a cross-sectional embedded sample and performing measurements by SEM•EDS (scanning electron microscope and energy dispersive X-ray spectroscopy). The method of measuring the thickness of the second coating layer 14 by the SEM•EDS is the same as the method of measuring the thickness of the coating layer 13 by the SEM•EDS in the first embodiment, and thus its detailed explanation is omitted below.

Incidentally, in the metal-carbon fiber reinforced plastic material composite 2 according to this embodiment illustrated in FIG. 3, one or a plurality of coating layers may further exist between the second coating layer 14 and the CFRP layer 12A.

Other Modified Examples

<Coating Base Treatment>

When forming the coating layer 13, it is preferable to perform a generally known coating base treatment on the metal plate 11 or the metal member 11A as necessary. This coating base treatment is generally performed by a conversion treatment, and prior to the coating base treatment, a surface conditioning treatment with an acid or alkaline aqueous solution containing iron group metal ions such as Ni is often performed. Further, before the surface conditioning treatment, alkaline degreasing is performed to clean the base steel plate. In order to obtain chromium-free coated steel plates, the conversion treatment is performed using a conversion treatment solution containing practically no chromium, in place of performing a chromate treatment. A typical example of such a conversion treatment solution is a silica conversion treatment solution consisting of silicon compounds such as liquid-phase silica, gas-phase silica, and/or silicate as a main film component, with resin coexisting therein in some cases.

The conversion treatment is not limited to the silica-based conversion treatment. In addition to the silica-based conversion treatment solution, various chromium-free conversion treatment solutions to be used for the coating base treatment have been proposed and are expected to be proposed in the future. Such chromium-free conversion treatment solutions can also be used. As for a deposition amount of a conversion treatment film formed by the conversion treatment, an appropriate deposition amount can be selected according to the conversion treatment to be used. In the case of the silica-based conversion treatment solution, a normal deposition amount will be in a range of 1 to 20 mg/m$^2$ in terms of Si. The above-described coating base treatment is performed, leading to an improvement in the adhesion between the metal plate and the coating layer.

The metal-carbon fiber reinforced plastic material composite 2 according to the second embodiment of the present invention has been explained briefly above.

<Method of Producing a Metal-Carbon Fiber Reinforced Plastic Material Composite>

Then, there will be explained methods of producing the metal-carbon fiber reinforced plastic material composite according to each of the embodiments of the present invention.

(Method of Producing the Metal-Carbon Fiber Reinforced Plastic Material Composite 1)

The method of producing the metal-carbon fiber reinforced plastic material composite 1 according to the first embodiment of the present invention includes: a step of applying a coating material intended for forming the coating layer 13 to the metal plate 11 or the metal member 11A and performing drying or baking thereon to form the coating layer 13; and a step of molding the metal plate 11 or the metal member 11A with the coating layer 13 formed thereon and bonding carbon fiber reinforced plastics (the CFRP layer) 12 made of a thermoplastic matrix resin to an upper layer of the coating layer 13 by thermocompression bonding. Incidentally, before forming the coating layer 13 on the metal plate 11 or the metal member 11A, it is preferable to perform the coating base treatment on the metal plate 11 or the metal member 11A.

As for the coating material intended for forming the coating layer 13, the main component of a solvent is water. The product obtained by containing such a resin and blocked isocyanates as mentioned previously in such a solvent so as to have a predetermined content is used as the coating material. Further, such various additives as mentioned previously may be contained in such a coating material.

The step of applying the coating material intended for forming the coating layer 13 is not particularly limited, and in the case of a viscous liquid, it can be applied by a generally known method such as coating in a discharge method from a slit nozzle or a circular nozzle, brushing, blade coating, or spatula application. In the case of a coating material dissolved in a solvent, a generally known application method such as, for example, brushing, spray coating, a bar coater, discharge coating from variously shaped nozzles, die coater coating, curtain coater coating, roll coater coating, or ink jet coating can be used. A well-known method such as a bar coater, a roll coater, screen printing, or powder coating can be employed.

Further, the drying•baking intended for forming the coating layer 13 can be performed by, for example, a heating treatment or the like. As prerequisite heating conditions, the maximum attained temperature is preferably set to fall within a range of 80° C. or more and 250° C. or less and a holding time is preferably set to 10 seconds or more and 30 minutes or less. Incidentally, such a holding time means the time period during when the temperature is held within a range of (a target value of a maximum attained temperature β−10° C.) to (the target value of the maximum attained temperature β+10° C.).

In the case where the maximum attained temperature is less than 80° C., it is impossible to sufficiently dry•bake the coating layer 13, resulting in that the adhesion of the coating layer 13 may decrease. The maximum attained temperature is more preferred to be 100° C. or more and further preferred to be 120° C. or more. On the other hand, when the maximum attained temperature exceeds 250° C., thermal degradation of the coating layer 13 may be caused. The maximum attained temperature is more preferred to be 200° C. or less and further preferred to be 180° C. or less.

Further, in the case where the holding time is less than 10 seconds, it is impossible to sufficiently dry•bake the coating layer 13, resulting in that the adhesion of the coating layer 13 may decrease. The holding time is preferred to be 15 seconds or more and more preferred to be 20 seconds or more. On the other hand, when the holding time exceeds 30 minutes, thermal degradation of the coating layer 13 may be caused, or productivity may decrease. The holding time is more preferred to be 10 minutes or less and further preferred to be one minute or less.

Based on such preconditions as above, the maximum attained temperature is set to equal to or more than the dissociation temperature of the blocked isocyanate to be used in order to properly cause a formation reaction of the coating layer 13 (in other words, a crosslinking reaction between a predetermined resin contained in the coating material intended for forming the coating layer 13 and the blocked isocyanate).

Here, at the time of such drying•baking, as has been referred to previously, it is important to appropriately set the treatment conditions so as to make the unreacted isocyanate present after the crosslinking reaction for forming the coating layer 13 is completed in accordance with the above-described first method or second method.

[Case of Using the First Method]

There will be explained in detail the case of producing the unreacted isocyanate in the coating layer 13 by the first method. In this case, in order to more securely form the coating layer 13 and make a more appropriate amount of unreacted isocyanates remain in the coating layer 13, it is preferable to contain, for example, 1.2 to 2.0 equivalents of blocked isocyanate in the coating material intended for forming the coating layer 13 with respect to the amount of functional groups that can react with isocyanate groups present in a predetermined resin contained in the coating material. The blocked isocyanate is contained so as to satisfy such a relationship, thereby making it possible to more securely form the chemical bonds represented in the above (structural formula 1).

Here, the dissociation temperature of the blocked isocyanate to be used is set to a [° C.], the maximum attained temperature of the metal plate 11 or the metal member 11A (more specifically, the coating material-applied metal plate 11 or metal member 11A) when drying baking, which is intended for forming the coating layer 13, is set to β [° C.], and the thermocompression bonding temperature in the step of thermocompression bonding to the CFRP layer 12 in the following step is set to γ [° C.]. In this case, it is important to establish the relationship of α<γ. Further, the maximum attained temperature β is set so as to satisfy the relationship of α≤β within the range described in the above-described preconditions. Further, the maximum attained temperature β is preferably set so as to satisfy the relationship of α≤β<(α+30° C.) within the range described in the above-described preconditions. The maximum attained temperature β satisfies the relationship of α≤β<(α+30° C.), thereby making it possible to more securely make the unreacted isocyanate remain. Further, the holding time is further preferably set to 15 seconds or more and 60 seconds or less.

In the case of producing the unreacted isocyanate by the first method, the unreacted isocyanate remaining in the formed coating layer 13 is also in a state where the blocking agent has been dissociated from the isocyanate group and the isocyanate group has been activated. The isocyanate in such a state gradually reacts with moisture in the treatment atmosphere, and thus, the remaining unreacted isocyanate may volatilize. Therefore, the time until the metal plate 11 or the metal member 11A after drying•baking is subjected to the step of thermocompression bonding to the CFRP layer 12 in the following step is preferably set to 12 hours or less under an environment of a relative humidity of 40% or less. There is a possibility that the chemical bonds represented in the above (structural formula 1) are not sufficiently formed when the time until the metal plate 11 or the metal member 11A after drying•baking is subjected to the thermocompression bonding step exceeds 12 hours even under such an environment of a relative humidity of greater than 40% or a relative humidity of 40% or less.

[Case of Using the Second Method]

There will be explained in detail the case of producing the unreacted isocyanate in the coating layer 13 by the second method. In this case, it is important to contain an appropriate combination of blocked isocyanates with different dissociation temperatures in the coating material intended for forming the coating layer 13. Here, the blocked isocyanate to cause a crosslinking reaction during the formation of the coating layer 13 is referred to as a first blocked isocyanate, and the blocked isocyanate that remains in the coating layer 13 to be an unreacted isocyanate is referred to as a second blocked isocyanate. In the case of using the second method, 1.0 to 1.2 equivalents of the first blocked isocyanate are preferably contained with respect to the amount of functional groups that can react with isocyanate groups present in a predetermined resin contained in the coating material intended for forming the coating layer 13, and 0.2 to 0.5 equivalents of the second blocked isocyanate are preferably contained with respect to the amount of functional groups that can react with isocyanate groups present in a predetermined resin contained in the coating material intended for forming the coating layer 13. The blocked isocyanate is contained so as to satisfy such a relationship, thereby making it possible to more securely form the chemical bonds represented in the above (structural formula 1).

Here, the dissociation temperature of the first blocked isocyanate is set to α1 [° C.], the dissociation temperature of the second blocked isocyanate is set to α2 [° C.], the maximum attained temperature is set to β [° C.], and the thermocompression bonding temperature in the step of thermocompression bonding to the CFRP layer 12 in the following step is set to γ [° C.]. In this case, it is important to establish the relationship of α1<α2<γ. Further, the maximum attained temperature β is set so as to satisfy the relationship of α1≤β<α2 within the range described in the above-described preconditions. Thereby, when the coating layer 13 is formed, only the first blocked isocyanate is activated and the crosslinking reaction between the resin in the coating material and the first blocked isocyanate proceeds, while the second blocked isocyanate is not activated. Thereby, the second blocked isocyanate remains in the formed coating layer 13 in an unactivated state. Incidentally, the maximum attained temperature β is preferably set so as to satisfy the relationships of α1≤β and (β+10° C.)<α2, and is more preferably set so as to satisfy the relationships of α1≤β<(α1+30° C.) and (β+10° C.)<α2 within the range described in the above-described preconditions. The maximum attained temperature β satisfies the relationship of (β+10° C.)<α2, thereby making it possible to more securely make the unreacted isocyanate remain while more securely suppressing the possibility of the second blocked isocyanate being activated when drying•baking the coating layer 13. This makes it possible to form the chemical bonds represented in the above (structural formula 1) in a more preferable state when the second blocked isocyanate reacts at a subsequent stage. Further, the maximum attained temperature β satisfies the relationship of α1≤β<(α1+30° C.), thereby making it possible to bring reaction efficiency into a more preferable state while suppressing degradation of the first blocked isocyanate. Further, the holding time is further preferably set to 15 seconds or more and 60 seconds or less.

As described above, in the case of the second method, the blocked isocyanate that is not activated remains in the coating layer 13 after being formed, and thus the unreacted isocyanate remaining in the coating layer 13 does not disappear and handling of the metal plate 11 or the metal member 11A after drying baking becomes simpler than the first method. Therefore, it can be said that the second method is a better method as compared to the first method.

Incidentally, as the method of the coating base treatment, a generally known treatment method such as, for example, a dipping and drying method, a dipping•rinsing•drying method, a spraying•rinsing•drying method, a coating•drying method, or a coating•drying and curing method can be used. As for the application method, application can be performed by a generally known method, such as dipping, brushing, spraying, a roll coater, a bar coater, or a blade coater.

Next, the step of thermocompression bonding the CFRP layer 12 will be explained in detail.

Concretely, first, the metal plate 11 or the metal member 11A on which the coating layer 13 with the unreacted isocyanate remaining therein is formed and a CFRP molding prepreg or CFRP are placed to obtain a stack. Incidentally, in the case of using the CFRP, a bonding surface of the CFRP is preferably roughened by blasting or the like, or activated by a plasma treatment, a corona treatment, or the like, for example. Then, this stack is heated and pressurized (thermocompression bonded), thereby making it possible to obtain the CFRP layer 12.

Here, thermocompression bonding conditions in this step are as follows.

The thermocompression bonding temperature γ [° C.] is set to 100° C. or more after satisfying such relationships as above with the dissociation temperatures α, α1, and α2 [° C.] of the blocked isocyanate. When the thermocompression bonding temperature is less than 100° C., the adherability to the CFRP and the impregnation of a CFRP base deteriorate because the melt viscosity of the resin forming the coating layer 13 is high. The thermocompression bonding temperature γ is preferred to be 150° C. or more, more preferred to be 160° C. or more, and further preferred to be 180° C. or more. Within such a temperature range, as long as the matrix resin is a crystalline resin, the thermocompression bonding temperature γ [° C.] is more preferred to be the temperature equal to or more than the melting point, and as long as the matrix resin is an amorphous resin, the thermocompression bonding temperature γ [° C.] is more preferred to be the temperature equal to or more than Tg+150° C.

On the other hand, the thermocompression bonding temperature γ [° C.] is set to 400° C. or less. When the thermocompression bonding temperature γ [° C.] exceeds 400° C., excessive heat is applied, which may cause decomposition of the resin forming the coating layer 13. The thermocompression bonding temperature γ [° C.] is preferred to be 300° C. or less, more preferred to be 270° C. or less, and further preferred to be 250° C. or less.

However, it is important to set the thermocompression bonding temperature γ [° C.] to less than the boiling point of the blocked isocyanate even within such a thermocompression bonding temperature range as above.

The pressure in thermocompression bonding is set to 3 MPa or more. When the pressure in thermocompression bonding is less than 3 MPa, the impregnation of the CFRP base deteriorates. On the other hand, the pressure in thermocompression bonding is not particularly limited, but it is preferably set to 5 MPa or less, for example, because excessive pressure application may cause deformation or damage.

The thermocompression bonding time is set to three minutes or more. When the thermocompression bonding time is less than three minutes, it is impossible to make an unreacted isocyanate group in the coating layer 13 and an epoxy group in the CFRP molding prepreg or the CFRP react with each other sufficiently to achieve desired adhesion. On the other hand, the upper limit value of the thermocompression bonding time is not defined in particular. However, when the thermocompression bonding time is too long, the matrix resin of the coating layer 13 or the CFRP layer 12 may be thermally degraded, and when the matrix resin of the CFRP layer 12 is a thermoplastic resin, the melted thermoplastic resin may flow out. Therefore, the thermocompression bonding time is preferably set to 30 minutes or less, more preferably set to 20 minutes or less, and further preferably set to 10 minutes or less.

Incidentally, it is preferred that such batch molding as above should be performed by hot pressing, but the material preheated to a predetermined temperature can also be quickly placed in a low-temperature pressure molding machine to be processed.

(Post-Step)

In a post-step on the metal-carbon fiber reinforced plastic material composite, in addition to the coating, drilling for mechanical bonding to other members by bolting, riveting, or the like, applying adhesives for adhesive bonding, and so on are performed as needed.

(Method of Producing the Metal-Carbon Fiber Reinforced Plastic Material Composite 2)

The method of producing the metal-carbon fiber reinforced plastic material composite 2 according to the second embodiment of the present invention includes: a step of applying a coating material intended for forming the coating layer 13 to the metal plate 11 or the metal member 11A and performing drying or baking thereon to form the coating layer 13 with an unreacted isocyanate remaining therein; a step of applying a coating material intended for forming the second coating layer 14 to at least a portion of the surface of the coating layer 13 with the unreacted isocyanate remaining therein; and a step of thermocompression bonding the CFRP layer 12A to at least a portion of the surface of the second coating layer 14. Incidentally, before forming the coating layer 13 on the metal plate 11 or the metal member 11A, it is preferable to perform the coating base treatment on the metal plate 11 or the metal member 11A.

Here, the step of forming the coating layer 13 is the same as that of the method of producing the metal-carbon fiber reinforced plastic material composite 1 according to the first embodiment, and thus, its detailed explanation is omitted. Further, the step of thermocompression bonding the CFRP layer 12A is also the same as that of the method of producing the metal-carbon fiber reinforced plastic material composite 1 according to the first embodiment, and thus, its detailed explanation is omitted.

In the step of forming the second coating layer 14, the coating material intended for forming the second coating layer 14 is set to a coating material containing an epoxy resin as a main component thereof. Such a coating material may contain various additives such as the ones that can be contained in the coating material intended for forming the coating layer 13 in the first embodiment.

The step of applying the coating material intended for forming the second coating layer 14 is not limited in particular, and in the case of a viscous liquid, it can be applied by a generally known method such as coating in a discharge method from a slit nozzle or a circular nozzle, brushing, blade coating, or spatula application. In the case of a coating material dissolved in a solvent, a generally known application method such as, for example, brushing, spray coating, a bar coater, discharge coating from variously shaped nozzles, die coater coating, curtain coater coating, roll coater coating, or ink jet coating can be used. A well-known method such as a bar coater, a roll coater, screen printing, or powder coating can be employed.

The drying or baking is performed in a state where the coating material intended for forming the second coating layer 14 is applied, and thereby, the second coating layer 14 is formed, and at the same time, the chemical bonds represented in the above (structural formula 1) are formed in the vicinity of the interface between the coating layer 13 and the second coating layer 14. At this time, the maximum attained temperature at a drying or baking time is set to equal to or more than the dissociation temperature of the blocked isocyanate remaining in the coating layer 13 and less than the thermocompression bonding temperature at the thermocompression bonding step. Thereby, the blocked isocyanate remaining in the coating layer 13 is activated, and the epoxy group of the epoxy resin contained in the coating material intended for forming the second coating layer 14 and the activated isocyanate group react.

Here, in the case where the unreacted isocyanate is formed in the coating layer 13 in accordance with the above-described first method, the time until the step of forming the second coating layer 14 is performed after the formation of the coating layer 13 is preferably set to 12 hours or less under an environment of a relative humidity of 40% or less for the same reasons as in the first embodiment.

Incidentally, in the above explanation, there has been described the case of thermocompression bonding the CFRP layer 12A after performing the drying or baking treatment intended for forming the second coating layer 14. However, the formation of the second coating layer 14 and the thermocompression bonding of the CFRP layer 12A may be performed simultaneously by leaving the drying or baking treatment unperformed after the coating material intended for forming the second coating layer 14 is applied, and then thermocompression bonding the CFRP layer 12A. In this case, the coating material intended for forming the second coating layer 14 is turned into the second coating layer 14 during the thermocompression bonding treatment, and the epoxy group in the coating material and the unreacted isocyanate group in the coating layer 13 react to produce the chemical bonds represented in the above (structural formula 1), and the CFRP layer 12A and the second coating layer 14 are thermocompression bonded.

As above, one example of the method of producing the metal-carbon fiber reinforced plastic material composite according to each of the embodiments of the present invention has been explained in detail.

EXAMPLE

The present invention will be explained in further detail by examples below. Incidentally, the examples to be explained below are only one example of the present invention, and are not intended to limit the present invention.

Test Example 1

<1. Production of a Metal-CFRP Composite>
(Preparation of a Metal Plate)

A steel containing, as components, C: 0.131 mass %, Si: 1.19 mass %, Mn: 1.92%, P: 0.009 mass %, S: 0.0025 mass %, Al: 0.027 mass %, N: 0.0032 mass %, and the balance: Fe and impurities was hot rolled, and then was subjected to pickling, and further was cold rolled, and thereby a cold-rolled steel plate having a 1.0 mm thickness was obtained. Then, the fabricated cold-rolled steel plate was annealed in a continuous annealing apparatus under the condition where the maximum attained temperature becomes 820° C. A gas atmosphere in an annealing furnace in an annealing step was set to an $N_2$ atmosphere containing 1.0 vol % of $H_2$. The fabricated cold-rolled steel plate is referred to as "CR."

Further, there was also prepared one obtained in a manner that the fabricated cold-rolled steel plate was annealed at the annealing step in the continuous annealing apparatus having the annealing step under the condition where the maximum attained temperature becomes 820° C., and then was hot-dip galvanized in a plating step. The gas atmosphere in the annealing furnace in the annealing step was set to an $N_2$ atmosphere containing 1.0 vol % of $H_2$. Two types of Zn-0.2% Al (to be referred to as "GI") and Zn-0.09% Al (to be referred to as "GA") were used as a component of a plating bath in the plating step. Incidentally, as for the steel plate using the hot dipping bath of Zn-0.09% Al plating (GA), the steel plate was immersed in the hot dipping bath, and while pulling out the steel plate from the hot dipping bath, an $N_2$ gas was sprayed on the steel plate from a slit nozzle to perform gas wiping, and after adjusting a deposition amount, the steel plate was heated in an induction heater at a sheet temperature of 480° C. to be alloyed to diffuse Fe in the steel plate into a plating layer. Here, the plating deposition amount on each of the plated steel plates was set to 60 g/m² per one side for GI, and was set to 45 g/m² per one side for GA.

Incidentally, a tensile strength of three types of the fabricated metal plates was measured, and then they were each 980 MPa.

Further, in addition to the above-described three types of steel plates, a commercially available aluminum plate (6,000 series, thickness: 1 mm) was prepared, (which is referred to as "AL").

(Pretreatment Step)

Some of the above-described four types of metal plates were degreased with an alkaline degreasing agent "Fine Cleaner E6404" manufactured by Nihon Parkerizing Co., Ltd., and then, on each of the metal plates, an aqueous solution to which 2.5 g/L of γ-aminopropyltriethoxysilane, 1 g/L of water-dispersed silica ("SNOWTEX N" manufactured by Nissan Chemical Corporation), and 3 g/L of water-soluble acrylic resin (polyacrylic acid as a reagent) were added was applied by a bar coater, and then they were dried in a hot oven under the condition where an attained plate temperature becomes 150° C. Further, a deposition amount of the treatment was set to 10 mg/m² in terms of Si. As a method of measuring the deposition amount, the deposition amount was measured by using fluorescent X-rays, a calibration curve was drawn from the relationship between an obtained detection intensity and the calculated deposition amount, and by using this, the deposition amount was found.

(Coating Layer Formation Step)

The following coating materials were produced. Incidentally, in the following explanation, various physical property values such as an average molecular weight, a dissociation temperature, and an average particle size each are a catalog value.

[Coating Material A]

A coating material A was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be an equivalent to the hydroxyl group of the water-dispersible resin and adding water to the resultant as necessary.

[Coating Material B]

A coating material B was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be 1.2 times the equivalent to the hydroxyl group of the water-dispersible resin and adding water to the resultant as necessary.

[Coating Material C]

A coating material C was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be 1.5 times the equivalent to the hydroxyl group of the water-dispersible resin and adding water to the resultant as necessary.

[Coating Material D]

A coating material D was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be two times the equivalent to the hydroxyl group of the water-dispersible resin and adding water to the resultant as necessary.

[Coating Material E]

A coating material D was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be an equivalent to the hydroxyl group of the water-dispersible resin, and further adding a water-based isocyanate (ELASTRON BN-27 manufactured by DKS Co. Ltd.: dissociation temperature 180° C.) to the resultant to be 0.5 times the equivalent to the hydroxyl group of the water-dispersible resin and adding water to the resultant as necessary.

[Coating Material F]

A coating material F was produced by adding a water-based isocyanate (ELASTRON BN-11 manufactured by DKS Co. Ltd.: dissociation temperature 150° C.) to a water-dispersible urethane resin (SUPERFLEX 620 manufactured by DKS Co. Ltd.: dispersion average particle size 20 nm) to be an equivalent to the hydroxyl group of the water-dispersible resin, and further adding a water-based isocyanate (ELASTRON BN-27 manufactured by DKS Co. Ltd.: dissociation temperature 180° C.) to the resultant to be 0.5 times the equivalent to the hydroxyl group of the water-dispersible resin and adding water to the resultant as necessary.

[Coating Material G]

A binder resin was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be an equivalent to the hydroxyl group of the water-dispersible resin, and further adding a water-based isocyanate (ELASTRON BN-27 manufactured by DKS Co. Ltd.: dissociation temperature 180° C.) to the resultant to be 0.5 times the equivalent to the hydroxyl group of the water-dispersible resin. A coating material G was produced by adding aluminium dihydrogen triphosphate (K-WHITE 450H manufactured by TAYCA CORPORATION, average particle size 1 μm to 3 μm) to this binder resin at a mass ratio of 85:15 per solid content and adding water to the resultant as necessary.

[Coating Material H]

A binder resin was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be an equivalent to the hydroxyl group of the water-dispersible resin, and further adding a water-based isocyanate (ELASTRON BN-27 manufactured by DKS Co. Ltd.: dissociation temperature 180° C.) to the resultant to be 0.5 times the equivalent to the hydroxyl group of the water-dispersible resin. A coating material H was produced by adding each of vanadium boride (manufactured by JAPAN NEW METALS CO., LTD., average particle size 1 to 3 μm) and doped zinc oxide (23-kt manufactured by HAKUSUI TECH CO., LTD., average particle size 0.5 μm) to this binder resin at a mass ratio of 80:2.5:17.5 per solid content and adding water to the resultant as necessary.

[Coating material I]

A binder resin was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be an equivalent to the hydroxyl group of the water-dispersible resin, and further adding a water-based isocyanate (ELASTRON BN-27 manufactured by DKS Co. Ltd.: dissociation temperature 180° C.) to the resultant to be 0.5 times the equivalent to the hydroxyl group of the water-dispersible resin. A coating material I was produced by adding an epoxy-based silane coupling agent (Sila-Ace 5510 manufactured by NICHIBI TRADING Co., Ltd.) to this binder resin at a mass ratio of 90:10 per solid content and adding water to the resultant as necessary.

[Coating Material J]

A binder resin was produced by adding a water-based isocyanate (ELASTRON BN-11 manufactured by DKS Co. Ltd.: dissociation temperature 150° C.) to a water-dispersible polyester resin (VYLONALVYLON MD1480 manufactured by TOYOBO CO., LTD.: average molecular weight 15,000) to be an equivalent to the hydroxyl group of the water-dispersible resin, and further adding a water-based isocyanate (ELASTRON BN-27 manufactured by DKS Co. Ltd.: dissociation temperature 180° C.) to the resultant to be 0.5 times the equivalent to the hydroxyl group of the water-dispersible resin. A coating material J was produced by adding each of aluminium dihydrogen triphosphate (K-WHITE 450H manufactured by TAYCA CORPORATION, average particle size 1 μm to 3 μm), vanadium boride (manufactured by JAPAN NEW METALS CO., LTD., average particle size 1 to 3 μm), doped zinc oxide (23-kt manufactured by HAKUSUI TECH CO., LTD., average particle size 0.5 μm), and an epoxy-based silane coupling agent (Sila-Ace 5510 manufactured by NICHIBI TRADING Co., Ltd.) to this binder resin at a mass ratio of 40:20:2:15:8 per solid content and adding water to the resultant as necessary.

[Coating Material K]

A coating material K was produced by adding polyamine (LUCKAMIDE TD-993 manufactured by DIC Corporation) to an epoxy resin (EPICLON 850-S manufactured by DIC Corporation) at a mass ratio of 70:30 per solid content. Finally, a spacer for film thickness adjustment (glass beads) was added to the coating material K at a mass ratio of 99.5:0.5.

[Coating Material L]

A one-component epoxy-based thermosetting adhesive (Betamate 1496S manufactured by The Dow Chemical Company) was set as a coating material L. Finally, a spacer for film thickness adjustment (glass beads) was added to the coating material L at a mass ratio of 99.5:0.5.

[Coating material M]

A coating material M was produced by adding polyamine (LUCKAMIDE TD-993 manufactured by DIC Corporation) to an epoxy resin (EPICLON 850-S manufactured by DIC Corporation) at a mass ratio of 80:20 per solid content. Finally, a spacer for film thickness adjustment (glass beads) was added to the coating material M at a mass ratio of 99.5:0.5.

[Coating Material N]

A binder resin was produced by adding polyamine (LUCKAMIDE TD-993 manufactured by DIC Corporation) to an epoxy resin (EPICLON 850-S manufactured by DIC Corporation) at a mass ratio of 80:20 per solid content. A coating material N was produced by adding hydrophobic silica (AEROSIL RY50 manufactured by AERPSIL Co., Ltd.) to this binder resin at a mass ratio of 95:5 per solid content. Finally, a spacer for film thickness adjustment (glass beads) was added to the coating material N at a mass ratio of 99.5:0.5.

[Coating Material O]

A binder resin of a coating material O was produced by adding polyamine (LUCKAMIDE TD-993 manufactured by DIC Corporation) to an epoxy resin (EPICLON 850-S manufactured by DIC Corporation) at a mass ratio of 80:20 per solid content. The coating material O was produced by adding each of aluminium dihydrogen triphosphate (K-WHITE G105 manufactured by TAYCA CORPORATION, average particle size 1 to 3 μm), calcium carbonate (a general reagent, average particle size 2 μm), hydrophobic silica (AEROSIL RY50 manufactured by AERPSIL Co., Ltd.), and an epoxy-based silane coupling agent (Sila-Ace 5510 manufactured by NICHIBI TRADING Co., Ltd.) to this binder resin O at a mass ratio of 84:5:5:5:1 per solid content. Finally, a spacer for film thickness adjustment (glass beads) was added to the coating material O at a mass ratio of 99.5:0.5.

Among the above-described produced coating materials, the coating material A to the coating material J were each applied on the metal plate that was subjected to the aforementioned pretreatment to be baked in an oven so that the maximum attained temperature became 160° C., and coating layers 13 were fabricated. The fabricated coating layers 13 are illustrated in Table 1 below. Incidentally, the application step was performed by changing the count of a bar coater so as to have a predetermined film thickness and changing dilution conditions.

Among the above-described produced coating materials, the coating material K to the coating material O were each applied on the metal plate 11 on which the coating layer 13 was formed, and then, after the later-described CFRP layer was bonded thereto, they were placed in an oven at a set temperature of 180° C. for 30 minutes to be heated and cured. Thereby, the second coating layer 14 was formed between the coating layer 13 and the CFRP layer.

Incidentally, immediately after the coating layer 13 was formed, the step of bonding the later-described CFRP layer or the step of forming the second coating layer 14 was performed.

(Production of a CFRP Prepreg)
[CFRP Prepreg 1]

A powder having an average particle size D50 of 80 μm, which was obtained by pulverizing and classifying a bisphenol A-type phenoxy resin "Phenotohto YP-50S" manufactured by NIPPON STEEL Chemical & Material Co., Ltd. (Mw=40,000, hydroxyl equivalent=284 g/eq, melt viscosity at 250° C.=90 Pa·s, Tg=83° C.), was subjected to powder coating on a reinforcing fiber base made of carbon fiber (cloth material: IMS60 manufactured by Toho Tenax) in an electrostatic field under the conditions of a charge of 70 kV and a spraying air pressure of 0.32 MPa. Thereafter, the resultant was heated and melted in an oven at 170° C. for one minute to thermally fuse the resin, to thereby produce a phenoxy resin CFRP prepreg 1 having a thickness of 0.65 mm, an elastic modulus of 75 [GPa], a tensile load of 13500 [N], and Vf (a fiber volume fraction) of 60%.

Incidentally, the average particle size of the pulverized and classified phenoxy resin on a volume basis at a cumulative volume of 50% was measured with a laser diffraction/scattering particle size distribution analyzer (Microtrac MT3300EX, manufactured by NIKKISO CO., LTD.).

[CFRP Prepreg 2]

A powder having an average particle size D50 of 80 μm, which was obtained by pulverizing and classifying nylon 6 of a general reagent, was subjected to powder coating on a reinforcing fiber base made of carbon fiber (cloth material: IMS60 manufactured by Toho Tenax) in an electrostatic field under the conditions of a charge of 70 kV and a spraying air pressure of 0.32 MPa. Thereafter, the resultant was heated and melted in an oven at 170° C. for one minute to thermally fuse the resin, to thereby produce a nylon 6 resin CFRP prepreg 2 having a thickness of 0.65 mm, an elastic modulus of 75 [GPa], a tensile load of 13500 [N], and Vf (a fiber volume fraction) of 50%.

Incidentally, the average particle size of the pulverized and classified nylon 6 resin on a volume basis at a cumulative volume of 50% was measured with a laser diffraction/scattering particle size distribution analyzer (Microtrac MT3300EX, manufactured by NIKKISO CO., LTD.).

(Formation of a CFRP Layer)

The above-described CFRP prepregs were combined so as to have a predetermined thickness and a predetermined composition to make a stack. The obtained stack was pressed at 3 MPa for three minutes in a press machine with a flat mold heated to 250° C. to make the CFRP layer.

Incidentally, depending on the fabrication conditions, a stack was made by overlaying the formed prepreg having a size of 20 mm in width×80 mm in length on the metal plate 11 with the coating layer 13 laminated thereon, and the obtained stack was pressed at 3 MPa for three minutes in a press machine with a flat mold heated to 250° C. to make the CFRP layer.

The compositions of the CFRP fabricated by the above-described methods will be described below in a summarized manner.

[CFRP 1]

Four layers of the CFRP prepreg 1 were layered to be thermocompression bonded, and CFRP 1 were fabricated.

[CFRP 2]

Four layers of the CFRP prepreg 2 were layered to be thermocompression bonded, and CFRP 2 were fabricated.

[CFRP 3]

Further, as thermosetting CFRP, epoxy pan-based CFRP 3 (VF 60%, 1 mm in thickness) manufactured by NIPPON STEEL & SUMIKIN MATERIALS CO., LTD. were used.

(Composite Sample)

Laminated bodies were formed with the combinations illustrated in Table 1 below to fabricate samples of the metal-carbon fiber reinforced plastic material composite.

(Thickness Measurement of the Coating Layer/Second Coating Layer)

The obtained composite sample was cut, embedded in a resin, polished, and then, deposited to fabricate a cross-sectional embedded sample. The fabricated cross-sectional embedded sample was observed by a scanning microscope (S-3400N manufactured by Hitachi High-Tech Fielding Corporation), to measure the thickness of the coating layer/second coating layer in accordance with the previously described measurement method.

(Interfacial Bonding Examination)

The obtained composite sample was cut, embedded in a resin, and then, polished to fabricate a cross-sectional embedded sample. Measurement places of the fabricated cross-sectional embedded sample were first specified using a Fourier transform infrared spectrometer (micro IR, 610FTIR microscope manufactured by Agilent Technologies Japan, Ltd.) equipped with an optical microscope, in accordance with the previously described method. That is, the interface vicinity region $R_{IF}$ between the coating corresponding to the coating layer 13 and the CFRP layer 12 and the middle vicinity region $R_C$ of the CFRP layer 12, or the interface vicinity region $R_{IF}$ between the coating corresponding to the coating layer 13 and the coating corresponding to the second coating layer 14 and the middle vicinity region $R_C$ of the second coating layer 14 were each specified. Thereafter, the infrared absorption spectrum in each of the regions was measured by using the same micro IR by the micro-ATR method, and each peak height in the wavenumber bands of P1: 3660 $cm^{-1}$ to 3570 $cm^{-1}$, P2: 1200 $cm^{-1}$ to 1050 $cm^{-1}$, and P3: 1750 $cm^{-1}$ to 1715 $cm^{-1}$ was measured. Incidentally, when measuring the CFRP layer 12, the measurements were performed mainly on the part of the matrix resin with less carbon fiber material. Incidentally, the size of a measurement visual field in the micro IR was set to 30 μm×40 μm. The peak intensity at each five points was measured to calculate the average peak intensity, and they were set to the peak intensities I1 to I3. Thereafter, by using the obtained respective peak intensities I1 to I3, four types of peak intensity ratios ($I2_{IF}/I1_{IF}$), ($I3_{IF}/I1_{IF}$), ($I2_C/I1_C$), and ($I3_C/I1_C$) were calculated.

Incidentally, when measuring the infrared absorption spectrum by the micro-ATR method, a measurement resolution was set to 10 μm, and the measurements in the interface vicinity region $R_{IF}$ and the middle vicinity region $R_C$ were performed.

As for the obtained peak intensity ratios, the case where ($I2_{IF}/I1_{IF}$) and ($I3_{IF}/I1_{IF}$) are equal to or more than three times ($I2_C/I1_C$) and ($I3_C/I1_C$) respectively was evaluated as "A," the case where one or both of ($I2_{IF}/I1_{IF}$) and ($I3_{IF}/I1_{IF}$) are equal to or more than two times and less than three times ($I2_C/I1_C$) and ($I3_C/I1_C$) was evaluated as "B," the case where one or both of ($I2_{IF}/I1_{IF}$) and ($I3_{IF}/I1_{IF}$) are equal to or more than 1.5 times and less than two times ($I2_C/I1_C$) and ($I3_C/I1_C$) was evaluated as "C", the case where ($I2_{IF}/I1_{IF}$) and ($I3_{IF}/I1_{IF}$) both are less than 1.5 times ($I2_C/I1_C$) and ($I3_C/I1_C$) was evaluated as "D," and the marks "A," "B," "C," and "D" were determined as a pass.

(Tensile Shear Test 1)

Figure 4:
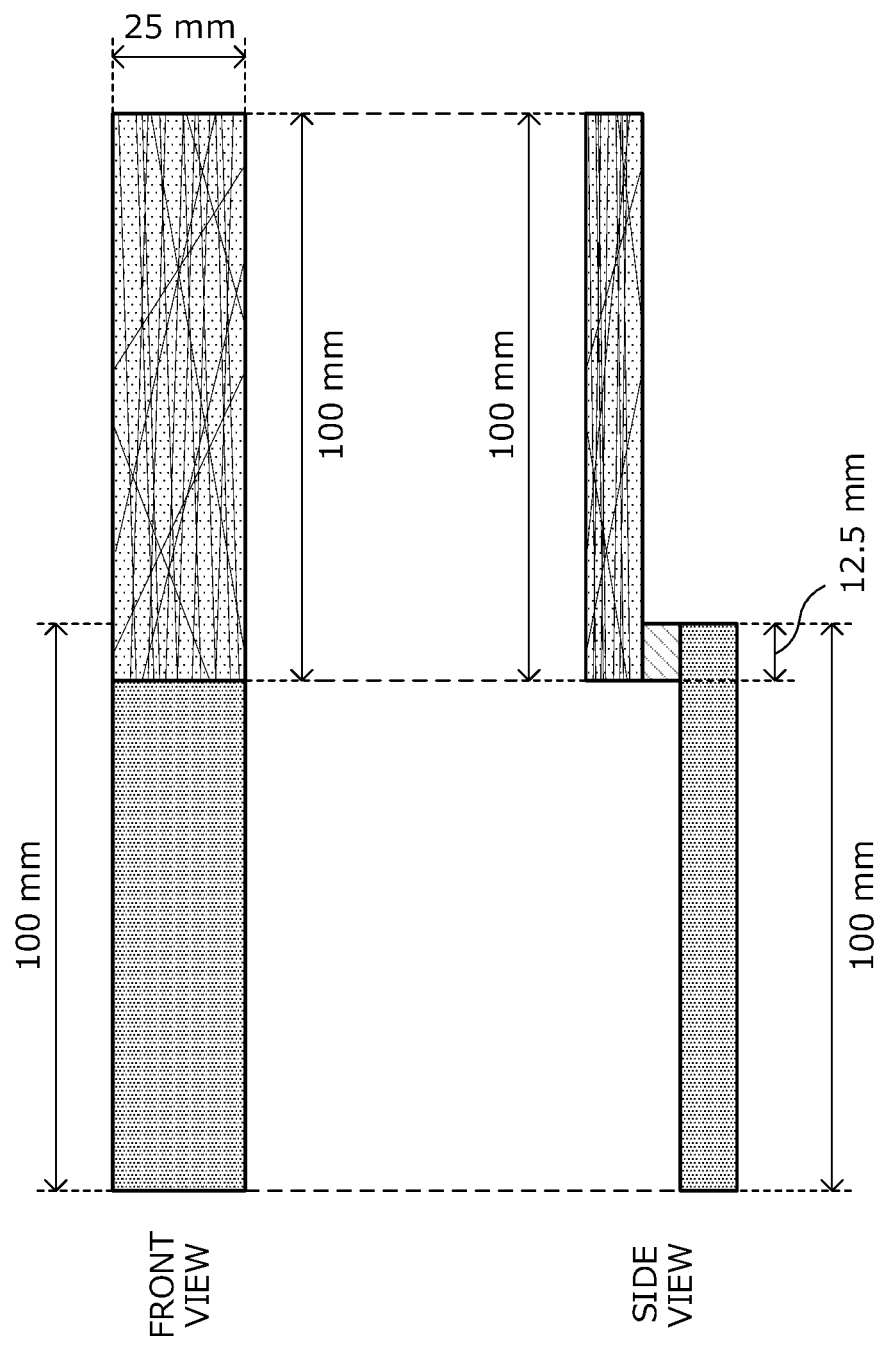
FIG. 4 is a front view and a side view of an adhesive shear test piece fabricated in an example.

A composite tensile test piece illustrated in FIG. 4 was fabricated. A tensile shear test was performed by using the obtained composite tensile test piece and a tensile tester. The composite tensile test piece with an obtained shear stress 1 being 25 MPa or more was evaluated as "A," the composite tensile test piece with the shear stress 1 being 20 MPa or more and less than 25 MPa was evaluated as "B," the composite tensile test piece with the shear stress 1 being 15 MPa or more and less than 20 MPa was evaluated as "C," the composite tensile test piece with the shear stress 1 being less than 20 MPa was evaluated as "D," and the marks "A" and "B" were determined as a pass.

(Tensile Shear Test 2)

The composite tensile test piece illustrated in FIG. 4 was left to stand for 20 days under an environment of 80° C. and a relative humidity of 95% and then left to stand for one day under an environment of 40° C., and a water resistance deterioration test was performed. A tensile shear test was performed by using the composite tensile test piece whose water resistance deteriorated and a tensile tester, and a shear stress 2 was obtained. The composite tensile test piece in which (the shear stress 2)/(the shear stress 1) is 70% or more and an area ratio of an interfacial failure including the coating layer in a peeled surface is 0% was evaluated as "A," the composite tensile test piece in which (the shear stress 2)/(the shear stress 1) is 70% or more and the area ratio of the interfacial failure including the coating layer in the peeled surface is greater than 0% and 10% or less was evaluated as "B," the composite tensile test piece in which (the shear stress 2)/(the shear stress 1) is 70% or more and the area ratio of the interfacial failure including the coating layer in the peeled surface is greater than 10% and 15% or less was evaluated as "C," the composite tensile test piece in which (the shear stress 2)/(the shear stress 1) is 70% or more and the area ratio of the interfacial failure including the coating layer in the peeled surface is greater than 15% and 20% or less was evaluated as "D," the composite tensile test piece in which (the shear stress 2)/(the shear stress 1) is less than 70% or (the shear stress 2)/(the shear stress 1) is 70% or more and the area ratio of the interfacial failure including the coating layer in the peeled surface is greater than 20% was evaluated as "E, and the marks "A," "B," and "C" were determined as a pass.

Obtained evaluation results are illustrated in Table 1 below in a summarized manner.

TABLE 1

| | METAL MEMBER 11A | | COATING LAYER 13 | | SECOND COATING LAYER 14 | | EVALUATION | | | |
|---|---|---|---|---|---|---|---|---|---|---|
| No | METAL PLATE 11 TYPE | PRE TREATMENT | TYPE | FILM THICKNESS/ μm | TYPE | FILM THICKNESS/ μM | CFRP LAYER TYPE | INTERFACIAL BONDING | TENSILE STRENGTH | TENSILE STRENGTH AFTER DETERIORATION | NOTE |
| 1 | CR | PERFORMED | — | — | — | — | CFRP1 | D | A | E | COMPARATIVE EXAMPLE |
| 2 | CR | PERFORMED | A | 3 | — | — | CFRP1 | D | A | D | COMPARATIVE EXAMPLE |
| 3 | CR | PERFORMED | B | 3 | — | — | CFRP1 | B | A | B | EXAMPLE |
| 4 | CR | PERFORMED | C | 3 | — | — | CFRP1 | B | A | B | EXAMPLE |
| 5 | CR | PERFORMED | D | 3 | — | — | CFRP1 | A | A | A | EXAMPLE |
| 6 | CR | PERFORMED | E | 3 | — | — | CFRP1 | A | A | A | EXAMPLE |
| 7 | CR | PERFORMED | F | 3 | — | — | CFRP1 | A | A | A | EXAMPLE |
| 8 | CR | PERFORMED | G | 3 | — | — | CFRP1 | A | A | A | EXAMPLE |
| 9 | CR | PERFORMED | H | 3 | — | — | CFRP1 | A | A | A | EXAMPLE |
| 10 | CR | PERFORMED | I | 3 | — | — | CFRP1 | A | A | A | EXAMPLE |
| 11 | CR | PERFORMED | J | 3 | — | — | CFRP1 | A | A | A | EXAMPLE |
| 12 | CR | PERFORMED | E | 0.1 | — | — | CFRP1 | C | A | C | EXAMPLE |
| 13 | CR | PERFORMED | E | 0.2 | — | — | CFRP1 | B | A | B | EXAMPLE |
| 14 | CR | PERFORMED | E | 0.4 | — | — | CFRP1 | A | A | B | EXAMPLE |
| 15 | CR | PERFORMED | E | 10 | — | — | CFRP1 | A | A | A | EXAMPLE |
| 16 | GI | PERFORMED | E | 0.4 | — | — | CFRP1 | A | A | B | EXAMPLE |
| 17 | GA | PERFORMED | E | 0.4 | — | — | CFRP1 | A | A | A | EXAMPLE |
| 18 | AL | PERFORMED | E | 0.4 | — | — | CFRP1 | A | A | B | EXAMPLE |
| 19 | GI | PERFORMED | G | 0.2 | — | — | CFRP1 | B | A | B | EXAMPLE |
| 20 | GI | PERFORMED | G | 0.4 | — | — | CFRP1 | B | A | B | EXAMPLE |
| 21 | GA | PERFORMED | G | 0.2 | — | — | CFRP1 | B | A | A | EXAMPLE |
| 22 | GA | PERFORMED | G | 0.4 | — | — | CFRP1 | B | A | A | EXAMPLE |
| 23 | GI | PERFORMED | J | 0.2 | — | — | CFRP1 | B | A | B | EXAMPLE |

TABLE 1-continued

| | METAL MEMBER 11A | | COATING LAYER 13 | | SECOND COATING LAYER 14 | | | EVALUATION | | | |
|---|---|---|---|---|---|---|---|---|---|---|---|
| No | METAL PLATE 11 TYPE | PRE TREATMENT | TYPE | FILM THICK- NESS/ μm | TYPE | FILM THICK- NESS/ μM | CFRP LAYER TYPE | INTER- FACIAL BONDING | TENSILE STRENGTH | TENSILE STRENGTH AFTER DETERIORATION | NOTE |
| 24 | GI | PERFORMED | J | 0.4 | — | — | CFRP1 | B | A | B | EXAMPLE |
| 25 | GA | PERFORMED | J | 0.2 | — | — | CFRP1 | B | A | A | EXAMPLE |
| 26 | GA | PERFORMED | J | 0.4 | — | — | CFRP1 | B | A | A | EXAMPLE |
| 27 | CR | PERFORMED | D | 3 | — | — | CFRP2 | D | A | E | COMPARATIVE EXAMPLE |
| 28 | CR | PERFORMED | E | 3 | — | — | CFRP2 | D | A | E | COMPARATIVE EXAMPLE |
| 29 | CR | PERFORMED | F | 3 | — | — | CFRP2 | D | A | E | COMPARATIVE EXAMPLE |
| 30 | CR | PERFORMED | G | 3 | — | — | CFRP2 | D | A | D | COMPARATIVE EXAMPLE |
| 31 | CR | PERFORMED | H | 3 | — | — | CFRP2 | D | A | D | COMPARATIVE EXAMPLE |
| 32 | CR | PERFORMED | I | 3 | — | — | CFRP2 | D | A | D | COMPARATIVE EXAMPLE |
| 33 | CR | PERFORMED | E | 3 | K | 200 | CFRP3 | A | A | A | EXAMPLE |
| 34 | CR | PERFORMED | E | 3 | L | 200 | CFRP3 | A | A | A | EXAMPLE |
| 35 | CR | PERFORMED | E | 3 | M | 200 | CFRP3 | A | A | A | EXAMPLE |
| 36 | CR | PERFORMED | E | 3 | N | 200 | CFRP3 | A | A | A | EXAMPLE |
| 37 | CR | PERFORMED | E | 3 | O | 200 | CFRP3 | A | A | A | EXAMPLE |
| 38 | CR | PERFORMED | E | 3 | K | 50 | CFRP3 | B | A | B | EXAMPLE |
| 39 | CR | PERFORMED | E | 3 | K | 100 | CFRP3 | A | A | A | EXAMPLE |
| 40 | CR | PERFORMED | E | 3 | K | 200 | CFRP3 | A | A | A | EXAMPLE |
| 41 | CR | PERFORMED | E | 3 | K | 500 | CFRP3 | A | A | A | EXAMPLE |
| 42 | CR | PERFORMED | E | 3 | K | 1000 | CFRP3 | A | B | B | EXAMPLE |
| 43 | CR | PERFORMED | — | — | K | 200 | CFRP3 | D | A | E | COMPARATIVE EXAMPLE |
| 44 | CR | PERFORMED | — | — | L | 200 | CFRP3 | D | A | D | COMPARATIVE EXAMPLE |
| 45 | CR | PERFORMED | — | — | M | 200 | CFRP3 | D | A | E | COMPARATIVE EXAMPLE |
| 46 | CR | PERFORMED | — | — | N | 200 | CFRP3 | D | A | D | COMPARATIVE EXAMPLE |
| 47 | CR | PERFORMED | — | — | O | 200 | CFRP3 | D | A | D | COMPARATIVE EXAMPLE |
| 48 | CR | PERFORMED | J | 3 | K | 200 | CFRP1 | A | A | A | EXAMPLE |
| 49 | CR | PERFORMED | J | 3 | L | 200 | CFRP1 | A | A | A | EXAMPLE |
| 50 | CR | PERFORMED | J | 3 | M | 200 | CFRP1 | A | A | A | EXAMPLE |
| 51 | CR | PERFORMED | J | 3 | N | 200 | CFRP1 | A | A | A | EXAMPLE |
| 52 | CR | PERFORMED | J | 3 | O | 200 | CFRP1 | A | A | A | EXAMPLE |
| 53 | GA | PERFORMED | J | 3 | K | 200 | CFRP1 | A | A | A | EXAMPLE |
| 54 | GA | PERFORMED | J | 3 | L | 200 | CFRP1 | A | A | A | EXAMPLE |
| 55 | GA | PERFORMED | J | 3 | M | 200 | CFRP1 | A | A | A | EXAMPLE |
| 56 | GA | PERFORMED | J | 3 | N | 200 | CFRP1 | A | A | A | EXAMPLE |
| 57 | GA | PERFORMED | J | 3 | O | 200 | CFRP1 | A | A | A | EXAMPLE |

As is clear from Table 1 above, it is found out that the composite samples that fall under the examples of the present invention exhibit excellent adhesion and adhesion durability, while the composite samples that fall under comparative examples of the present invention are inferior in at least one of the adhesion and the adhesion durability.

Test Example 2

In the same manner as in the above-described test example 1, the cold-rolled steel plates "CR" were prepared, and the ones that were subjected to the same pretreatment as that in the test example 1 and the ones that were not subjected to the pretreatment were fabricated. The "coating material C" prepared in the same manner as in the above-described test example 1 was applied to these cold-rolled steel plates "CR" so as to have a film thickness after drying of 3 μm, and they were baked at various temperatures. Further, in the same manner as in the above-described test example 1, the "coating material A" and the "coating material B" were prepared, and then the "coating material A" and the "coating material B" that were obtained were mixed at 1:1, to thereby prepare a coating material in which an equivalent of blocked isocyanates is 1.1 to the hydroxyl group of the water-dispersible resin additionally. There was also prepared the one obtained by applying the obtained mixed coating material to the cold-rolled steel plate "CR" so as to have a film thickness after drying of 3 μm and baking the resultant. After the baking, the one that was held for eight hours under the environment where the relative humidity was controlled to 38%, the one that was held for 12 hours under the environment where the relative humidity was controlled to 40%, and the one that was held for 12 hours under the environment where the relative humidity was controlled to 45% were prepared, and they were subjected to the thermocompression bonding treatment of the CFRP. As for the sample in No. 61 illustrated in Table 2 below, in order to make the unreacted isocyanate in the coating layer 13 disappear completely, the cold-rolled steel plate was allowed to stand for 24 hours under the environment where the relative humidity was controlled to 60%, and then was subjected to the thermocompression bonding treatment of the CFRP. The used CFRP were the same as the "CFRP 1" in the test example 1, and as for the thermocompression bonding condition, the thermocompression bonding temperature γ [° C.] was changed variously, the pressure was set to 3 MPa, and the holding time was set to three minutes. Incidentally, as for the sample in No. 68 illustrated in Table 2 below, after the coating layer 13 was formed, the second coating layer 14 was formed by using the "coating material L" prepared in the same manner as in the above-described test example 1 so as to have a film thickness after drying of 200 μm. Thereafter, the thermocompression bonding treatment of the "CFRP 3" prepared in the same manner as in the above-described test example 1 was performed.

The various conditions in this test example are illustrated in Table 2 in a summarized manner. Incidentally, in the column of "ENVIRONMENT CONTROL UNTIL FOLLOWING STEP" in Table 2 below, the condition "A" corresponds to the condition of the relative humidity being 38% and the eight-hour holding, the condition "B" corresponds to the condition of the relative humidity being 40% and the 12-hour holding, the condition "C" corresponds to the condition of the relative humidity being 45% and the 12-hour holding, and the condition "D" corresponds to the condition of the relative humidity being 60% and the 24-hour holding. The composite samples illustrated in Table 2 were subjected to the interfacial bonding examination, the tensile shear test 1, and the tensile shear test 2 in the same manner as in the test example 1, and the respective composite samples were evaluated. Obtained results are illustrated in Table 2 in a summarized manner.

TABLE 2

| | METAL MEMBER 11A | | COATING LAYER 13 | | | | SECOND COATING LAYER 14 | |
| | | | | | DISSOCIATION | MAXIMUM ATTAINED | | |
| | METAL PLATE 11 | PRE | | FILM THICK-NESS/ | TEMPER-ATURE | TEMPER-ATURE | | FILM THICK-NESS/ |
| No | TYPE | TREATMENT | TYPE | μm | α/° C. | β/° C. | TYPE | μm |
|---|---|---|---|---|---|---|---|---|
| 58 | CR | PERFORMED | C | 3 | 150 | 160 | — | — |
| 59 | CR | PERFORMED | C | 3 | 150 | 80 | — | — |
| 60 | CR | PERFORMED | C | 3 | 150 | 220 | — | — |
| 61 | CR | PERFORMED | C | 3 | 150 | 160 | — | — |
| 62 | CR | PERFORMED | C | 3 | 150 | 160 | — | — |
| 63 | CR | PERFORMED | C | 3 | 150 | 160 | — | — |
| 64 | CR | PERFORMED | C | 3 | 150 | 160 | — | — |
| 65 | CR | NOT PERFORMED | C | 3 | 150 | 160 | — | — |
| 66 | CR | PERFORMED | C | 3 | 150 | 160 | — | — |
| 67 | CR | PERFORMED | C | 3 | 150 | 160 | — | — |
| 68 | CR | PERFORMED | C | 3 | 150 | 160 | L | 200 |
| 69 | CR | PERFORMED | A + B (1:1) | 3 | 150 | 160 | — | — |

| | ENVIRONMENT CONTROL UNTIL FOLLOWING STEP | CFRP LAYER | | EVALUATION | | | |
| | | | THERMO COMPRESSION BONDING TEMPER-ATURE γ/° C. | INTER-FACIAL BOND-ING | TENSILE STRENGTH | TENSILE STRENGTH AFTER DETERI-ORATION | |
| No | | TYPE | | | | | NOTE |
|---|---|---|---|---|---|---|---|
| 58 | A | CFRP1 | 250 | B | A | B | EXAMPLE |
| 59 | A | CFRP1 | 250 | D | C | D | COMPARATIVE EXAMPLE |
| 60 | A | CFRP1 | 250 | B | B | A | EXAMPLE |
| 61 | D | CFRP1 | 250 | D | C | D | COMPARATIVE EXAMPLE |
| 62 | A | CFRP1 | 80 | D | C | C | COMPARATIVE EXAMPLE |
| 63 | A | CFRP1 | 150 | B | B | B | EXAMPLE |
| 64 | A | CFRP1 | 420 | D | C | D | COMPARATIVE EXAMPLE |
| 65 | A | CFRP1 | 250 | B | B | B | EXAMPLE |
| 66 | B | CFRP1 | 250 | B | A | B | EXAMPLE |
| 67 | C | CFRP1 | 250 | C | B | B | EXAMPLE |
| 68 | A | CFRP3 | 250 | A | A | A | EXAMPLE |
| 69 | A | CFRP1 | 250 | C | B | B | EXAMPLE |

As is clear from Table 2 above, it is found out that the composite samples produced by the production method that falls under the examples of the present invention obtain a good interfacial bonding state and exhibit excellent adhesion and adhesion durability, while the composite samples produced by the production method that falls under the comparative examples of the present invention fail to obtain a good interfacial bonding state and are inferior in the adhesion and the adhesion durability.

Test Example 3

In the same manner as in the above-described test example 1, the cold-rolled steel plates "CR" were prepared, and the ones that were subjected to the same pretreatment as that in the test example 1 and the ones that were not subjected to the pretreatment were fabricated. The "coating material E" prepared in the same manner as in the above-described test example 1 was applied to these cold-rolled steel plates "CR" so as to have a film thickness after drying of 3 μm, and they were baked at various temperatures. Further, in the same manner as in the above-described test example 1, the "coating material C" was prepared, and then the obtained "coating material C" and the "coating material E" were mixed at 1:1, to thereby prepare a coating material in which an equivalent of the first blocked isocyanates is 1.25 to the hydroxyl group of the water-dispersible resin and an equivalent of the second blocked isocyanates is 0.25 to the hydroxyl group of the water-dispersible resin additionally. There was also prepared the one obtained by applying the obtained mixed coating material to the cold-rolled steel plate "CR" so as to have a film thickness after drying of 3 μm and baking the resultant. After the baking, the cold-rolled steel plate was allowed to stand for 24 hours in a room (with the average relative humidity of 60%), and then was subjected to the thermocompression bonding treatment of the CFRP. The used CFRP were the same as the "CFRP 1" in the test example 1, and as for the thermocompression bonding condition, the thermocompression bonding temperature γ [° C.] was changed variously, the pressure was set to 3 MPa, and the holding time was set to three minutes. Incidentally, as for the sample in No. 76 illustrated in Table 3 below, after the coating layer 13 was formed, the second coating layer 14 was formed by using the "coating material L" prepared in the same manner as in the above-described test example 1 so as to have a film thickness after drying of 200 μm. Thereafter, the thermocompression bonding treatment of the "CFRP 3" prepared in the same manner as in the above-described test example 1 was performed.

The various conditions in this test example are illustrated in Table 3 in a summarized manner. The composite samples illustrated in Table 3 were subjected to the interfacial bonding examination, the tensile shear test 1, and the tensile shear test 2 in the same manner as in the test example 1, and the respective composite samples were evaluated. Obtained results are illustrated in Table 3 in a summarized manner.

TABLE 3

| | METAL MEMBER 11A | | | COATING LAYER 13 | | | | SECOND COATING LAYER 14 | |
|---|---|---|---|---|---|---|---|---|---|
| No | METAL PLATE 11 TYPE | PRE TREATMENT | TYPE | FILM THICK-NESS/ μm | DISSOCI-ATION TEMPER-ATURE α1/° C. | DISSOCI-ATION TEMPER-ATURE α2/° C. | MAXIMUM ATTAINED TEMPER-ATURE β/° C. | TYPE | FILM THICK-NESS/ μm |
| 70 | CR | PERFORMED | E | 3 | 150 | 180 | 160 | — | — |
| 71 | CR | PERFORMED | E | 3 | 150 | 180 | 220 | — | — |
| 72 | CR | PERFORMED | E | 3 | 150 | 180 | 175 | — | — |
| 73 | CR | PERFORMED | E | 3 | 150 | 180 | 160 | — | — |
| 74 | CF | PERFORMED | E | 3 | 150 | 180 | 160 | — | — |
| 75 | CR | NOT PERFORMED | E | 3 | 150 | 180 | 160 | — | — |
| 76 | CR | PERFORMED | E | 3 | 150 | 180 | 160 | L | 200 |
| 77 | CR | PERFORMED | C + E (1:1) | 3 | 150 | 180 | 160 | — | — |

| | CFRP LAYER | | EVALUATION | | | |
|---|---|---|---|---|---|---|
| No | TYPE | THERMO COM-PRESSION BONDING TEMPER-ATURE γ/° C. | INTER-FACIAL BONDING | TENSILE STRENGTH | TENSILE STRENGTH AFTER DETERI-ORATION | NOTE |
| 70 | CFRP1 | 250 | A | A | A | EXAMPLE |
| 71 | CFRP1 | 250 | D | A | D | COMPARATIVE EXAMPLE |
| 72 | CFRP1 | 250 | B | A | B | EXAMPLE |
| 73 | CFRP1 | 80 | D | C | C | COMPARATIVE EXAMPLE |
| 74 | CFRP1 | 420 | D | C | D | COMPARATIVE EXAMPLE |
| 75 | CFRP1 | 250 | A | B | B | EXAMPLE |
| 76 | CFRP3 | 250 | A | A | A | EXAMPLE |
| 77 | CFRP1 | 250 | B | B | B | EXAMPLE |

As is clear from Table 3 above, it is found out that the composite samples produced by the production method that falls under the examples of the present invention obtain a good interfacial bonding state and exhibit excellent adhesion and adhesion durability, while the composite samples produced by the production method that falls under the comparative examples of the present invention fail to obtain a good interfacial bonding state and are inferior in the adhesion and the adhesion durability.

In the foregoing, the preferred embodiments of the present invention have been explained in detail while referring to the attached drawings, but, the present invention is not limited to such examples. It is apparent that a person ordinary skilled in the art to which the present invention pertains is able to devise various variation or modification examples within the scope of the technical spirit described in the claims, and it should be understood that such examples belong to the technical scope of the present invention as a matter of course.

EXPLANATION OF CODES 1, 2 metal-carbon fiber reinforced plastic material composite
11 metal plate
11A metal member
12, 12A CFRP layer
13 coating layer
14 second coating layer
121 carbon fiber material
122, 122A matrix resin
131, 141 binder resin

What is claimed is:
1. A metal-carbon fiber reinforced plastic material composite, comprising:
  a metal member;
  a carbon fiber reinforced plastic material that contains a predetermined matrix resin and a carbon fiber material present in the matrix resin; and
  one or two layers of coating layers provided between the metal member and the carbon fiber reinforced plastic material, wherein
  in the case where the coating layer consists of one layer, the coating layer is a coating layer that is arranged on at least a portion of the metal member, contains a predetermined resin as a main component thereof, and contains an isocyanate group, and the matrix resin is a matrix resin that contains a phenoxy resin as a main component thereof, wherein an epoxy group in the phenoxy resin and an unreacted isocyanate present in the coating layer are chemically bonded to form bonds represented in the following (structural formula 1) in the vicinity of an interface between the carbon fiber reinforced plastic material and the coating layer, and
  in the case where the coating layer consists of two layers, the first coating layer that is located on the metal member side is a coating layer that is arranged on at least a portion of the metal member, contains a predetermined resin as a main component thereof, and contains an isocyanate group, and the second coating layer that is located on the carbon fiber reinforced plastic material side is a coating layer that is arranged on at least a portion of the first coating layer and contains an epoxy resin as a main component thereof, and has bonds represented in the following (structural formula 1) in the vicinity of an interface between the first coating layer and the second coating layer,

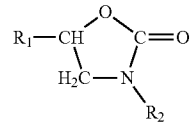

(Structural formula 1)

wherein, in the above (structural formula 1), $R_1$ represents an epoxy side chain and $R_2$ represents an isocyanate side chain.

2. The metal-carbon fiber reinforced plastic material composite according to claim 1, wherein
  the coating layer consists of one layer, and
  when a region from the interface between the carbon fiber reinforced plastic material and the coating layer to 20 μm in the thickness direction toward the carbon fiber reinforced plastic material side is defined as an interface vicinity, a region up to 10 μm from the middle of the carbon fiber reinforced plastic material in the thickness direction is defined as a middle vicinity, and the interface vicinity and the middle vicinity are each observed by Fourier transform infrared spectroscopy, peaks P1 to P3 exist in the following wavenumber bands and peak intensities I1 to I3 of the peaks P1 to P3 in each of the wavenumber bands satisfy the relationships expressed in the following expression (1) and expression (2),
  P1: 3660 $cm^{-1}$ to 3570 $cm^{-1}$
  P2: 1200 $cm^{-1}$ to 1050 $cm^{-1}$
  P3: 1750 $cm^{-1}$ to 1715 $cm^{-1}$ $$(I2_{IF}/I1_{IF}) \geq 1.5 \times (I2_C/I1_C) \quad \text{expression (1)}$$

$$(I3_{IF}/I1_{IF}) \geq 1.5 \times (I3_C/I1_C) \quad \text{expression (2)}$$

wherein, in the above expression (1) and expression (2), a subscript IF indicates the peak when the interface vicinity is observed, and a subscript C indicates the peak when the middle vicinity is observed.

3. The metal-carbon fiber reinforced plastic material composite according to claim 1, wherein
  the coating layer consists of two layers, and
  when a region from the interface between the coating layer and the second coating layer to 20 μm in the thickness direction toward the second coating layer side is defined as an interface vicinity, a region up to 10 μm from the middle of the second coating layer in the thickness direction is defined as a middle vicinity, and the interface vicinity and the middle vicinity are each observed by Fourier transform infrared spectroscopy, peaks P1 to P3 exist in the following wavenumber bands and peak intensities I1 to I3 of the peaks P1 to P3 in each of the wavenumber bands satisfy the relationships expressed in the following expression (1) and expression (2),
  P1: 3660 $cm^{-1}$ to 3570 $cm^{-1}$
  P2: 1200 $cm^{-1}$ to 1050 $cm^{-1}$
  P3: 1750 $cm^{-1}$ to 1715 $cm^{-1}$ $$(I2_{IF}/I1_{IF}) \geq 1.5 \times (I2_C/I1_C) \quad \text{expression (1)}$$

$$(I3_{IF}/I1_{IF}) \geq 1.5 \times (I3_C/I1_C) \quad \text{expression (2)}$$

wherein, in the above expression (1) and expression (2), a subscript IF indicates the peak when the interface vicinity is observed, and a subscript C indicates the peak when the middle vicinity is observed.

4. The metal-carbon fiber reinforced plastic material composite according to claim 3, wherein
the matrix resin is at least one of a phenoxy resin and an epoxy resin.

5. The metal-carbon fiber reinforced plastic material composite according to claim 1, wherein
the coating layer contains a thermosetting resin as a main component thereof.

6. The metal-carbon fiber reinforced plastic material composite according to claim 5, wherein
the thermosetting resin is at least one of a polyester resin and a urethane resin.

7. A method of producing a metal-carbon fiber reinforced plastic material composite,
the metal-carbon fiber reinforced plastic material composite including: a metal member; a carbon fiber reinforced plastic mated al that contains a predetermined matrix resin and a carbon fiber material present in the matrix resin; and one or two layers of coating layers provided between the metal member and the carbon fiber reinforced plastic material, the method comprising:
in the case where the coating layer consists of one layer,
a step of applying a coating material, the coating material containing a predetermined resin as a main component thereof and containing a blocked isocyanate having an isocyanate group protected by a blocking agent, to at least a portion of the metal plate or the metal member and performing drying or baking thereon to form the coating layer with an unreacted isocyanate remaining therein; and
a step of molding the metal plate or the metal member on which the coating layer with the unreacted isocyanate remaining therein is formed and bonding the carbon fiber reinforced plastic material, the carbon fiber reinforced plastic material containing, as the matrix resin, a matrix resin containing a phenoxy resin as a main component thereof and containing an epoxy, group, to an upper layer of the coating layer by thermocompression bonding,
the method comprising:
in the case where the coating layer consists of two layers,
a step of applying a first coating material, the first coating material containing a predetermined resin as a main component thereof and containing a blocked isocyanate having an isocyanate group protected by a blocking agent, to at least a portion of the metal plate or the metal member and performing drying or baking thereon to form the first coating layer with an unreacted isocyanate remaining therein;
a step of applying a second coating material containing an epoxy resin as a main component thereof to at least a portion of the first coating layer with the unreacted isocyanate remaining therein and performing drying or baking thereon to form the second coating layer; and
a step of bonding the carbon fiber reinforced plastic material to at least a portion of the second coating layer by thermocompression bonding, wherein
a dissociation temperature of the blocked isocyanate is lower than a thermocompression bonding temperature in the step of bonding by the thermocompression bonding,
when the dissociation temperature of the blocked isocyanate is set to $\alpha$ [° C.] and a maximum attained temperature in the case where the coating layer consists of one layer and in the step of forming the first coating layer in the case where the coating layer consists of two layers is set to $\beta$ [° C.], the maximum attained temperature $\beta$ is set to a temperature satisfying 80° C.$\leq \beta \leq$250° C. and $\alpha \leq \beta$ to make the unreacted blocked isocyanate remain in the formed coating layer and the formed first coating layer,
a maximum attained temperature in the step of forming the second coating layer in the case where the coating layer consists of two layers is set to equal to or more than the dissociation temperature of the blocked isocyanate and less than the thermocompression bonding temperature, and
as a thermocompression bonding condition in the step of bonding by the thermocompression bonding, the thermocompression bonding temperature falls within a range of 100° C. to 400° C., a pressure is 3 MPa or more, and a thermocompression bonding time is three minutes or more.

8. The method of producing the metal-carbon fiber reinforced plastic material composite according to claim 7, wherein
in the vicinity of an interface between the carbon fiber reinforced plastic material and the coating layer in the case where the coating layer consists of one layer, or in the vicinity of an interface between the first coating layer and the second coating layer in the case where the coating layer consists of two layers, bonds represented in the following (structural formula 1) are formed,

[Chemical formula 2]

(Structural formula 1)

$$R_1-CH\overset{O}{\underset{H_2C-N}{\diagup}}C=O$$
$$\qquad\qquad R_2$$

wherein, in the above (structural formula 1), $R_1$ represents an epoxy side chain and $R_2$ represents an isocyanate side chain.

9. The method of producing the metal-carbon fiber reinforced plastic material composite according to claim 7, wherein
in the coating material used in the step of forming the coating layer or the first coating layer, 1.2 to 2.0 equivalents of the blocked isocyanate are contained with respect to the amount of functional groups that react with the blocked isocyanate present in the resin contained in the coating material, and
a time until the following step is performed after the step of forming the coating layer or the first coating layer is finished is set to 12 hours or less under an environment of a relative humidity of 40% or less.

10. The method of producing the metal-carbon fiber reinforced plastic material composite according to claim 7, wherein
in the coating material used in the step of forming the coating layer or the first coating layer, as the blocked isocyanate, a first blocked isocyanate and a second blocked isocyanate that has a dissociation temperature higher than that of the first blocked isocyanate are contained,
the content of the first blocked isocyanate is 1.0 to 1.2 equivalents with respect to the amount of functional groups that react with the first blocked isocyanate present in the resin contained in the coating material, the content of the second blocked isocyanate is 0.2 to 0.5 equivalents with respect to the amount of functional groups that react with the first blocked isocyanate present in the resin contained in the coating material, when in the step of forming the coating layer or the first coating layer, a dissociation temperature of the first blocked isocyanate is set to α1, a dissociation temperature of the second blocked isocyanate is set to α2, and the thermocompression bonding temperature in the step of bonding by the thermocompression bonding is set to γ, the maximum attained temperature β is set so as to satisfy $α1 ≤ β ≤ α2 ≤ γ$.

11. The method of producing the metal-carbon fiber reinforced plastic material composite according to claim 10, wherein the maximum attained temperature β[° C.] in the case where the coating layer consists of one layer and in the step of forming the first coating layer in the case where the coating layer consists of two layers is set to a temperature satisfying 80° C. ≤ β ≤ 250° C., $α1 ≤ β$, and $(β+10°\,C.) < α2 < γ$.

12. The method of producing the metal-carbon fiber reinforced plastic material composite according to claim 7, wherein the maximum attained temperature β [° C.] in the case where the coating layer consists of one layer and in the step of forming the first coating layer in the case where the coating layer consists of two layers is set to a temperature satisfying 80° C. ≤ β ≤ 250° C. and $α ≤ β ≤ (α+30°\,C.)$.

13. The method of producing the metal-carbon fiber reinforced plastic material composite according to claim 7, wherein the coating layer consists of one layer, and when a region from the interface between the carbon fiber reinforced plastic material and the coating layer to 20 μm in the thickness direction toward the carbon fiber reinforced plastic material side is defined as an interface vicinity, a region up to 10 μm from the middle of the carbon fiber reinforced plastic material in the thickness direction is defined as a middle vicinity, and the interface vicinity and the middle vicinity are each observed by Fourier transform infrared spectroscopy, peaks P1 to P3 exist in the following wavenumber bands and peak intensities I1 to I3 of the peaks P1 to P3 in each of the wavenumber bands satisfy the relationships expressed in the following expression (1) and expression (2), P1: 3660 cm$^{-1}$ to 3570 cm$^{-1}$
P2: 1200 cm$^{-1}$ to 1050 cm$^{-1}$
P3: 1750 cm$^{-1}$ to 1715 cm$^{-1}$ $$(I2_{IF}/I1_{IF}) ≥ 1.5×(I2_C/I1_C) \quad \text{expression (1)}$$

$$(I3_{IF}/I1_{IF}) ≥ 1.5×(I3_C/I1_C) \quad \text{expression (2)}$$

wherein, in the above expression (1) and expression (2), a subscript IF indicates the peak when the interface vicinity is observed, and a subscript C indicates the peak when the middle vicinity is observed.

14. The method of producing the metal-carbon fiber reinforced plastic material composite according to claim 7, wherein the coating layer consists of two layers, and when a region from the interface between the coating layer and the second coating layer to 20 μm in the thickness direction toward the second coating layer side is defined as an interface vicinity, a region up to 10 μm from the middle of the second coating layer in the thickness direction is defined as a middle vicinity, and the interface vicinity and the middle vicinity are each observed by Fourier transform infrared spectroscopy, peaks P1 to P3 exist in the following wavenumber bands and peak intensities I1 to I3 of the peaks P1 to P3 in each of the wavenumber bands satisfy the relationships expressed in the following expression (1) and expression (2), P1: 3660 cm$^{-1}$ to 3570 cm$^{-1}$
P2: 1200 cm$^{-1}$ to 1050 cm$^{-1}$
P3: 1750 cm$^{-1}$ to 1715 cm$^{-1}$ $$(I2_{IF}/I1_{IF}) ≥ 1.5×(I2_C/I1_C) \quad \text{expression (1)}$$

$$(I3_{IF}/I1_{IF}) ≥ 1.5×(I3_C/I1_C) \quad \text{expression (2)}$$

wherein, in the above expression (1) and expression (2), a subscript IF indicates the peak when the interface vicinity is observed, and a subscript C indicates the peak when the middle vicinity is observed.

15. The method of producing the metal-carbon fiber reinforced plastic material composite according to claim 14, wherein the matrix resin is at least one of a phenoxy resin and an epoxy resin.

16. The method of producing the metal-carbon fiber reinforced plastic material composite according to claim 7, wherein the coating layer contains a thermosetting resin as a main component thereof.

17. The method of producing the metal-carbon fiber reinforced plastic material composite according to claim 16, wherein the thermosetting resin is at least one of a polyester resin and a urethane resin.

18. The method of producing the metal-carbon fiber reinforced plastic material composite according to claim 7, wherein before the step of bonding by the thermocompression bonding, at least one of a surface roughening treatment and a surface activation treatment is performed on a bonding surface of the carbon fiber reinforced plastic material.

* * * * *